(12) United States Patent
Gluckman et al.

(10) Patent No.: US 10,814,306 B2
(45) Date of Patent: *Oct. 27, 2020

(54) MOLECULARLY IMPRINTED POLYMER BEADS FOR EXTRACTION OF METALS AND USES THEREOF

(71) Applicant: 6th Wave Innovations Corp., Arnold, MD (US)

(72) Inventors: Jonathan P. Gluckman, Arnold, MD (US); Glen E. Southard, Park City, UT (US)

(73) Assignee: 6th Wave Innovations Corp., Baltimore, MD (US)

( * ) Notice: Subject to any disclaimer, the term of this patent is extended or adjusted under 35 U.S.C. 154(b) by 27 days.

This patent is subject to a terminal disclaimer.

(21) Appl. No.: 15/747,858

(22) PCT Filed: Jun. 8, 2016

(86) PCT No.: PCT/US2016/036370
§ 371 (c)(1),
(2) Date: Jan. 26, 2018

(87) PCT Pub. No.: WO2017/019181
PCT Pub. Date: Feb. 2, 2017

(65) Prior Publication Data
US 2018/0214845 A1    Aug. 2, 2018

Related U.S. Application Data

(60) Provisional application No. 62/197,360, filed on Jul. 27, 2015.

(51) Int. Cl.
*B01J 20/26*         (2006.01)
*B01J 20/28*         (2006.01)
(Continued)

(52) U.S. Cl.
CPC ............ *B01J 20/267* (2013.01); *B01D 15/20* (2013.01); *B01J 20/268* (2013.01);
(Continued)

(58) Field of Classification Search
None
See application file for complete search history.

(56) References Cited

U.S. PATENT DOCUMENTS 3,839,257 A   10/1974  Chiu et al.
4,406,972 A    9/1983  Fransen
(Continued)

FOREIGN PATENT DOCUMENTS

CN    102008946 A    4/2011
CN    102317322 A    1/2012
(Continued)

OTHER PUBLICATIONS

Ozkutuk et al., "Selective Separation of Thiocyanate Ion by Ion-Imprinted Polymer," Hacettepe Journal of Biology and Chemistry, vol. 37, No. 3, pp. 207-215, Sep. 9, 2009.
(Continued)

*Primary Examiner* — Harry D Wilkins, III
(74) *Attorney, Agent, or Firm* — Cooley LLP

(57) ABSTRACT

The present disclosure provides Molecularly Imprinted Polymer (MIP) technology for selectively sequestering one or more target molecules from chemical mixtures. Also disclosed herein are MIP beads and methods of making and using thereof.

32 Claims, 2 Drawing Sheets

Schematic of MIP Preparation

(51) Int. Cl.

| | |
|---|---|
| *B01J 20/30* | (2006.01) |
| *B01J 41/14* | (2006.01) |
| *C25C 1/20* | (2006.01) |
| *C22B 3/20* | (2006.01) |
| *C02F 1/28* | (2006.01) |
| *B01D 15/20* | (2006.01) |
| *C22B 3/04* | (2006.01) |
| *C22B 3/16* | (2006.01) |
| *C22B 3/00* | (2006.01) |
| *C08F 212/08* | (2006.01) |
| *C22B 11/08* | (2006.01) |
| *C02F 101/20* | (2006.01) |

(52) U.S. Cl.
CPC ... *B01J 20/28004* (2013.01); *B01J 20/28016* (2013.01); *B01J 20/28059* (2013.01); *B01J 20/28061* (2013.01); *B01J 20/3085* (2013.01); *B01J 41/14* (2013.01); *C02F 1/285* (2013.01); *C08F 212/08* (2013.01); *C22B 3/045* (2013.01); *C22B 3/1666* (2013.01); *C22B 3/20* (2013.01); *C22B 11/04* (2013.01); *C22B 11/08* (2013.01); *C25C 1/20* (2013.01); *C02F 2101/20* (2013.01); *Y02P 10/234* (2015.11)

(56) References Cited

U.S. PATENT DOCUMENTS

| | | | |
|---|---|---|---|
| 4,415,655 | A | 11/1983 | de Castro et al. |
| 4,532,232 | A | 7/1985 | Larsson et al. |
| 4,935,365 | A | 6/1990 | Nilsson et al. |
| 4,960,762 | A | 10/1990 | Sellergren et al. |
| 5,015,576 | A | 5/1991 | Nilsson et al. |
| 5,110,883 | A | 5/1992 | Gartner |
| 5,208,155 | A | 5/1993 | Mosbach et al. |
| 5,281,635 | A | 1/1994 | Bishop |
| 5,310,648 | A | 5/1994 | Arnold et al. |
| 5,321,102 | A | 6/1994 | Loy et al. |
| 5,372,719 | A | 12/1994 | Afeyan et al. |
| 5,786,428 | A | 7/1998 | Arnold et al. |
| 5,851,499 | A | 12/1998 | Gathje et al. |
| 6,063,637 | A | 5/2000 | Arnold et al. |
| 6,593,142 | B2 | 7/2003 | Kelly et al. |
| 7,067,702 | B2 | 6/2006 | Southard et al. |
| 7,319,038 | B2 | 1/2008 | Southard |
| 7,476,316 | B2 | 1/2009 | Southard |
| 7,678,870 | B2 | 3/2010 | Southard et al. |
| 8,058,208 | B2 | 11/2011 | Murray et al. |
| 8,591,842 | B2 | 11/2013 | Murray et al. |
| 9,504,988 | B1 | 11/2016 | Gluckman et al. |
| 2002/0092377 | A1 | 7/2002 | Ji et al. |
| 2005/0276781 | A1 | 12/2005 | Ross et al. |
| 2007/0090058 | A1 | 4/2007 | Southard |
| 2008/0038832 | A1* | 2/2008 | Sellergren ............ C08F 212/14 436/106 |
| 2008/0264868 | A1 | 10/2008 | Murray et al. |
| 2010/0091352 | A1 | 4/2010 | Kokeguchi et al. |
| 2010/0286130 | A1 | 11/2010 | Moellmann et al. |
| 2012/0045838 | A1 | 2/2012 | Krozer et al. |
| 2012/0225962 | A1 | 9/2012 | Hearn et al. |
| 2015/0291870 | A1 | 10/2015 | Van Horn et al. |
| 2016/0354770 | A1 | 12/2016 | Murray |
| 2018/0214845 | A1 | 8/2018 | Gluckman et al. |

FOREIGN PATENT DOCUMENTS

| | | |
|---|---|---|
| WO | WO-1989/010956 A1 | 11/1989 |
| WO | WO-2017/019181 A1 | 2/2017 |

OTHER PUBLICATIONS

International Search Report and Written Opinion dated Aug. 31, 2016, for International Application No. PCT/US2016/036370, 9 pages.

International Search Report and Written Opinion dated Jan. 17, 2018, for International Application No. PCT/US2017/059870, 11 pages.

Dahm M. et al. "Investigations on the system $ScCl_3/K_2CO_3/H_2O$: Synthesis and crystal structures of $K_5[Sc(CO_3)_4]*5H_2O$ and $K_7[Sc(CO_3)_4]CO_3*9*H_2O$", Zeitschrift fur Naturforschung Section B-A Journal of Chemical Sciences, 2002, vol. 57, issue 12, pp. 1439-1445; retrieved from the Internet: <http://www.znaturforsch.com/ab/v57b/s57b1439.pdf>, see entire document, especially p. 1439-1440.

Pyagai I. N. et al. "Recovery of sludge from alumina production", Russian Journal of Applied Chemistry, 2012, vol. 85, issue 11, pp. 1649-1653; retrieved from the Internet: <DOI: 10.1134/S107042721211002X>, see entire document, especially p. 1650.

Extended European Search Report dated Dec. 3, 2018, for European Application No. 16830976.3, 13 pages.

Songjun Li et al., "A Catalytic and Positively Thermosensitive Molecularly Imprinted Polymer," Advanced Functional Materials, Mar. 22, 2011 (Mar. 22, 2011), pp. 1194-1200, XP055526376, DOI: 10.1002/adfm.201001906.

Songjun Li et al., "On/off-switchable catalysis by a smart enzyme-like imprinted polymer," Journal of Catalysis, Academic Press, Duluth, MN, US, vol. 278, No. 2, Nov. 12, 2010 (Nov. 12, 2010), pp. 173-180, XP028142292, ISSN: 0021-9517, DOI: 10.1016/J.JCAT.2010.11.011 [retrieved on Nov. 20, 2010].

Supplementary European Search Report dated May 28, 2020, for European Application No. 17866594.9, 14 pages.

* cited by examiner

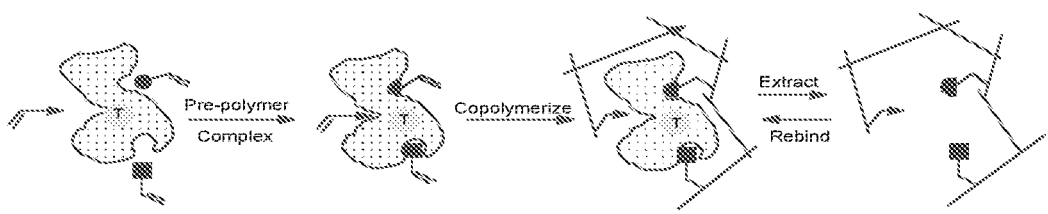
Figure 1: Schematic of MIP Preparation
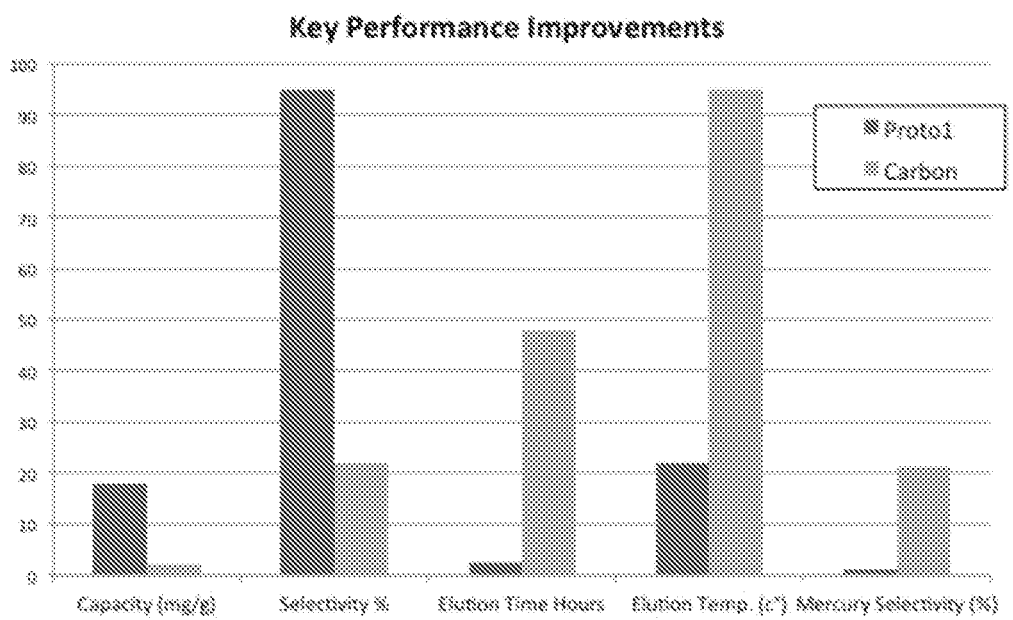
Figure 2. Proto1 is a MIP of the present disclosure, compared to activated carbon ("Carbon") in $Au(CN)_2^-$ sequestration for a simulated gold leach process stream

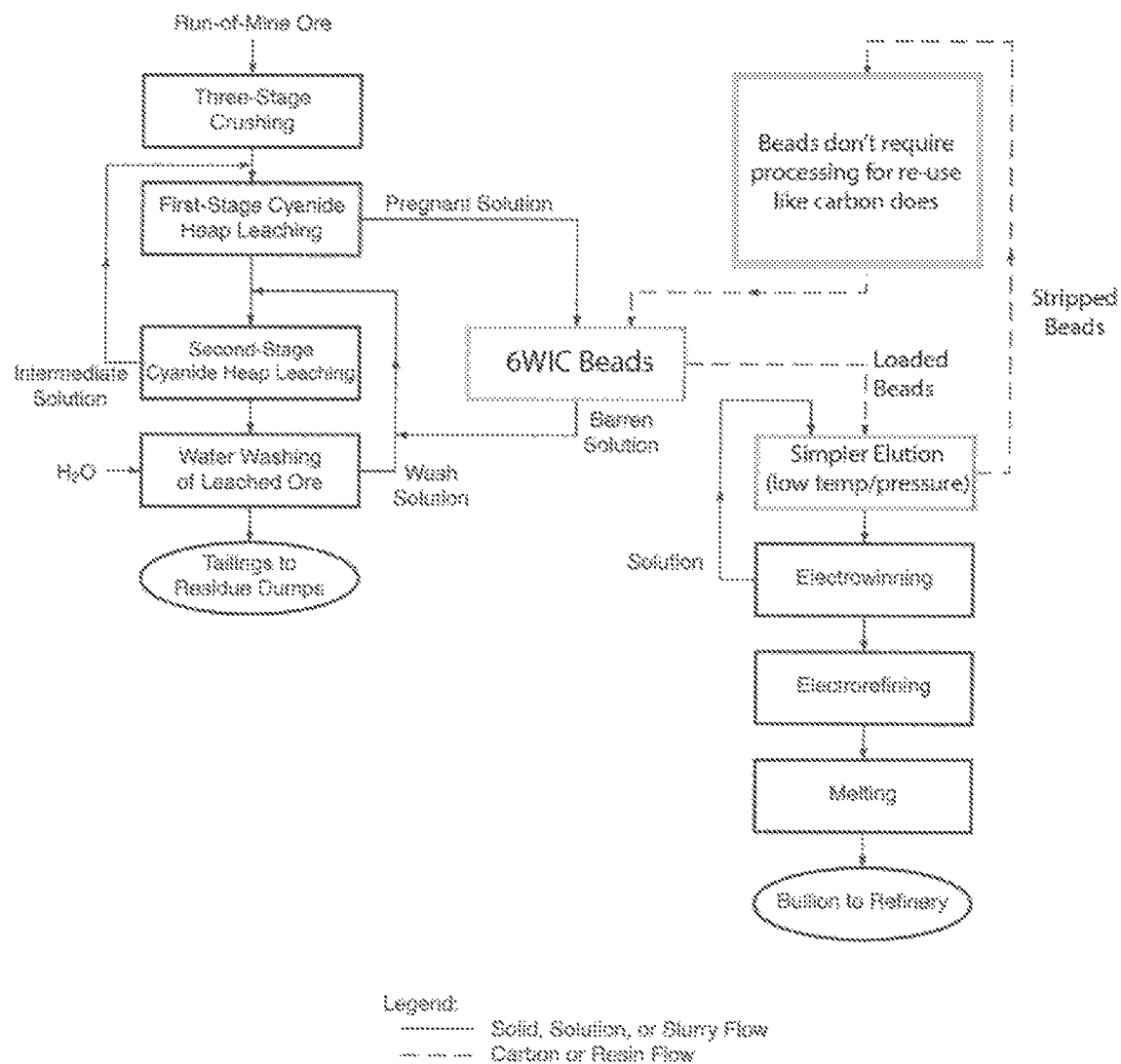
Figure 3: Comparison of MIP process ("6WIC Beads") vs. conventional activated carbon process

MOLECULARLY IMPRINTED POLYMER BEADS FOR EXTRACTION OF METALS AND USES THEREOF

CROSS REFERENCE TO RELATED APPLICATIONS

The present application is a National Stage Entry of PCT/US16/36370, filed Jun. 8, 2016, which claims the benefit of U.S. Application Ser. No. 62/197,360, filed Jul. 27, 2015, the contents of each of which are incorporated herein by reference in their entireties for all purposes.

BACKGROUND

Extraction and recovery processes are common, for example in water purification, mining, and waste treatment. While the specific unit operations and process chemistries may be different for these processes, the basic approach is the same—elaborate mechanical and chemical processes which are usually lengthy, energy intensive, and expensive. Many of these processes utilize, at least in part, absorbents such as activated carbon or ion exchange absorbents to remove or sequester dissolved species.

Carbon, particularly activated carbon, is a common absorbent, but is relatively nonspecific. Molecularly imprinted polymers ("MIPs") have been developed with substantially improved specificity for a "target" molecule which would be desirable to remove from a process stream (e.g., in waste treatment applications) or to sequester (e.g., isolate) from a process stream because of its value. MIPs are polymers designed to be highly selective for a specific target molecule. MIPs are prepared by polymerizing a polymerizable ligand which coordinates or "binds" to the target molecule. The target molecule and the polymerizable ligand are incorporated into a pre-polymerization mixture, allowed to form a complex, then polymerized (typically in the presence of one or more non-ligand monomers and a cross-linking monomer). The target molecule thus acts as a "template" to define a cavity or absorption site within the polymerized matrix which is specific to the target molecule (e.g., has a shape or size corresponding to the target molecule). The target molecule is then removed from the MIP prior to its use as an absorbent.

However, while highly selective to the desired target molecule, MIPs have significant drawbacks. For example, if the target molecule is highly valuable (e.g. a precious metal) or hazardous (e.g., toxic or radioactive), the need to use the target molecule itself as a template in preparing the MIP can be prohibitively expensive due to e.g., the cost of the target molecule or the precautions required to handle the target molecule compared to less selective, but far cheaper absorbants. In addition, because the target molecule must remain complexed to the polymerizable ligand during the polymer synthesis, if the target molecule/polymerizable ligand complex is unstable or otherwise incompatible with the polymerization conditions (e.g., catalyst, other monomers, low solubility, etc.) it may not be possible to prepare the MIP at all, or require complex or difficult reaction conditions. Accordingly, it would be desirable to prepare absorbents with the advantageous selectivity and other characteristics of conventional MIP materials, but without the disadvantages inherent in using the target molecule as a template in preparing the MIP. The methods and materials of the present disclosure provide such improvements over conventional MIP materials and processes.

SUMMARY

The present disclosure relates generally to molecularly imprinted polymers. More particularly, the present disclosure relates to cationic molecularly imprinted polymer beads for binding target compounds utilizing organic anions as surrogates for anionic metal complexes with similar charge and molecular structure. As such, the present disclosure involves the fields of chemistry, polymers, and materials science.

The present disclosure, in part, provides macroreticular polymer beads and methods of making and using thereof. The present disclosure also provides methods of selectively sequestering one or more target metal ions from a solution of the one or more target metal ions admixed with other ions. This disclosure addresses the need for new MIP technologies that can be used to selectively isolate the desired target in good yield, with high target removing efficiency, good capacity for the target, and be regenerable.

One of the embodiments of the present disclosure relates to a plurality of macroreticular polymer beads comprising a copolymer having a plurality of complexing cavities which selectively bind a target metal ion, wherein the copolymer is prepared from:
(a) a ligand monomer which is cationic or anionic and is complexed to a non-metal surrogate ion,
(b) an uncharged monomer, and
(c) a crosslinking monomer;
wherein:
(i) the charge of the copolymer in the complexing cavity is opposite the charge of the target metal ion, and
(ii) the non-metal surrogate ion has substantially the same shape and charge as the target metal ion.

Another embodiment relates to a method of preparing macroreticular molecularly imprinted polymer beads comprising polymerizing:
(a) a ligand monomer which is cationic or anionic and is complexed to a non-metal surrogate ion,
(b) an uncharged monomer, and
(c) a crosslinking monomer;
thereby forming a plurality of macroreticular molecularly imprinted polymer beads, each having a plurality of complexing cavities which selectively bind a target metal ion, wherein the size and charge of the non-metal surrogate ion is substantially the same as the target metal ion.

Some embodiments relate to a method of selectively sequestering one or more target metal ions from a solution of the one or more target metal ion ions admixed with other ions, comprising first contacting the macroreticular polymer beads with a stripping solution, whereby the non-metal surrogate ions are removed from the macroreticular polymer beads, then contacting the stripped beads with the solution, thereby selectively sequestering the target ion in the macroreticular polymer beads.

Unless otherwise defined, all technical and scientific terms used herein have the same meaning as commonly understood by one of ordinary skill in the art to which this disclosure belongs. In the case of conflict, the present specification, including definitions, will control. In the specification, the singular forms also include the plural unless the context clearly dictates otherwise. Although methods and materials similar or equivalent to those described herein can be used in the practice or testing of the present disclosure, suitable methods and materials are described below. All publications, patent applications, patents, and other references mentioned herein are incorporated by reference herein, for all purposes. The references cited herein are not admitted to be prior art to the claimed inventions. In addition, the materials, methods, and examples are illustrative only and are not intended to be limiting.

Other features and advantages of the present disclosure will be apparent from the following detailed description and claims.

BRIEF DESCRIPTION OF THE DRAWINGS

FIG. 1 is a schematic of the MIP production process.

FIG. 2 provides a comparison of a MIP of the present disclosure ("Protol"), compared to activated carbon ("Carbon") in $Au(CN)_2^-$ sequestration for a simulated gold leach process stream.

FIG. 3 provides a comparison of an exemplary MIP process ("6WIC Beads") vs. a conventional activated carbon process.

DETAILED DESCRIPTION

The present disclosure is directed, in various embodiments, to improved methods for preparing molecularly imprinted polymer ("MIP") absorbents or materials, MIP absorbents or materials prepared by such processes, and improved processes utilizing the MIP absorbents or materials of the present disclosure.

Absorption-based processes are often designed to separate, extract, or sequester a specific molecular specie or "target" molecule from a mixture, either to isolate the target molecule (e.g., because of its value), remove a specific specie from a mixture (e.g., because of its toxicity or other hazardous properties), or to detect the target molecule (or molecules associated with the target molecule). Molecularly imprinted polymers are highly selective absorbents with absorption sites specifically tailored to bind to a particular target molecule. Examples of known MIPs and methods of preparing and using MIPs include those disclosed in U.S. Pat. Nos. 7,067,702; 7,319,038; 7,476,316; 7,678,870; 8,058,208; 8,591,842, which are incorporated by reference herein in their entirety for all purposes. These MIPs are copolymers prepared by polymerizing a polymerizable ligand for the target molecule (i.e., a "ligand monomer") in a polymer matrix composed of one or more non-ligand monomers (e.g., styrene or other monomers which do not form a complex with the target molecule), and one or more crosslinking agents. Conventionally, the "templated" absorption sites characteristic of MIPs are prepared by forming an appropriate complex of the ligand monomer with the target molecule, then polymerizing the resulting target molecule-ligand monomer complex in the presence of one or more non-ligand monomers and at least one cross-linking agent, under suitable polymerization conditions. The resulting polymer structure comprises a matrix of the polymerized non-ligand monomer(s) with dispersed binding sites or cavities ("complexing cavities") containing the target molecule, still complexed to the (now polymerized) ligand monomer. Because the polymerization is carried out in the presence of the target molecule, the target molecule forms a "template" so that the size and shape of the complexing cavity is specific to the particular target molecule, resulting in highly selective binding to the target molecule relative to other molecules. A schematic diagram of the templating process for preparing MIP materials is shown in FIG. 1.

As discussed above, while utilizing the target molecule as a molecular template provides highly selective complexing cavities optimal for binding the target molecule, the conventional MIP manufacturing process poses significant manufacturing and/or scale-up problems due to the need to use the target molecule itself in manufacturing. Large scale manufacturing would therefore require use of large amounts of the target molecule, which can be a particular problem (even in small scale manufacturing) if the target molecule is expensive, relatively unavailable, toxic, radioactive, interferes with the polymerization of the MIP, etc., or any combinations of these factors.

Surprisingly, Applicants have found that the selectivity advantages of conventional MIPs can be retained without the need to use the target molecule itself as a template for the binding site, by substituting an appropriately selected "surrogate" molecule for the target molecule. As will be exemplified herein, a MIP selective for target molecule "A" can be prepared by polymerizing a complex of a suitable surrogate molecule "B" with ligand monomer(s), non-ligand monomer(s) and crosslinking monomer(s), provided that "A" and "B" complex to the ligand monomer using the same physicochemical mechanism, have similar size and/or shape, and "B" is one or more of less expensive, less hazardous (i.e., toxic, radioactive), or more compatible with the polymerization conditions compared to "A." The resulting "surrogate" templated MIPs, while perhaps somewhat less selective for the target molecule than those prepared using the conventional process (in which the target molecule serves as the molecular template) are much less expensive, safer to prepare, easier to manufacture and scale-up, etc., yet sufficiently selective in e.g., separation or extraction applications to be similar in performance to conventional MIPs, yet substantially lower in cost. Moreover, the "surrogate" templated MIPs of the present disclosure provide substantial improvements in overall separation process costs due to their combination of high performance at relatively low cost.

While various exemplified embodiments of MIP materials and methods disclosed herein relate to ionic MIPs, any suitable physicochemical interaction for binding a particular target molecule can be employed depending on the chemical structure and characteristics of the target molecule. Various different physicochemical interactions between the ligand monomer and target molecule which can be exploited to prepare MIPs materials according to the disclosure include covalent, ionic, ion-dipole, hydrogen bonding, dipole-dipole, induced dipole or instantaneous dipole-induced dipole (i.e., London dispersion) attractive interactions, and minimizing coulombic and steric repulsive interactions. When the target molecule is an ion (e.g., a "target ion"), it is convenient to utilize ionic interactions by selecting a ligand monomer having an ionic functional group of complementary charge. For example, when the target ion is cationic, the ligand monomer includes an anionic functional group (e.g., a carboxylate, sulfonate, phosphonate, or other acid salt) capable of forming a complex with the cationic target ion, and when the target ion is an anion, the ligand monomer includes a cationic functional group (for example a quaternary ammonium ion) capable or complexing with the anionic target ion. When target molecule is neutral (i.e., has no formal charge), suitable uncharged ligand monomers include but are not limited to monomers including functional groups such as amines, phosphines, esters, ethers, cryptands, thio ethers, Schiff bases and the like. Neutral target molecules typically include, for example small organic molecules such as but not limited to pesticides, drug molecules, radiotracers, and the like.

Suitable surrogates can be selected by first characterizing the size, shape, and relevant physicochemical characteristics of the target molecule. Candidate surrogate molecules of similar molecular shape and size, and similar physicochemical characteristics can then be identified by, for example, molecular modeling using commercially available molecular modeling programs such as ChemBioDraw® Ultra 14.0 For example, if the target molecule is ionic, the surrogate ion would be selected to have a similar size, shape, and charge as the target ion. Advantageously, the surrogate should be relatively inexpensive, non-toxic, and not interfere with the polymerization (i.e., should not form a highly unstable complex with the ligand monomer, poison the polymerization catalyst, inhibit the initiator, react with other monomers or polymerization solvents, be insoluble in the polymerization solvent, etc.).

Polymerizable ligands, for instance 4-vinylbenzyl tri-n-butyl ammonium chloride and other cationic ligands as described herein, have been designed for the extraction of anionic metallic salts from aqueous solutions. Such ligands are soluble in water until reacted or complexed with an anion, such as thiocyanate, and then precipitate from solution. The resulting precipitate is soluble in an organic solvent. The anion, such as thiocyanate, mimics the molecular shape and charge of a particular target metal anion, such as dicyanoaurate or dicyanoargenate, both of which are linear molecules with a single negative charge. The resulting ligand/anion pair is then polymerized into a hydrophobic polymer matrix, such as styrene, to form porous beads or particles, which can then be utilized for the selective removal of the desired metal anion (e.g., dicyanoaurate or dicyanoargenate) from an aqueous solution.

The use of a ligand/anion complex for producing ion selective MIP resins provides a material superior to existing ion-exchange resins, for example with improved selectivity for target ions, maintaining better activity during use, reduced need for multiple process steps to separate the target ion from other species which compete for the ion exchange binding sites, and improved regeneration properties. The use of such "surrogates" instead of the target ion in preparing MIPs also reduces the overall cost for developing and scaling up molecularly imprinted polymer resins, as well as reducing the amount of potential hazardous waste and/or reclamation of the target molecule (for further use), and their associated costs for processing.

MIP beads according to the present disclosure can have any suitable shape, ranging from approximately spherical, to elongated, irregular (e.g., similar to the irregular shape of cottage cheese curds), or formed to specific desired shapes.

In various embodiments, it is desirable that the molecularly imprinted polymer be in the form of beads, particularly porous beads that have sufficient porosity so as to allow facile mass transport in and out of the bead.

The term "bead" refers to a plurality of particles with an average particle size ranging from about 250 µm to about 1.5 mm. In some embodiments, the average particle size of the beads can be about 250 µm, about 300 µm, about 350 µm, about 400 µm, about 450 µm, about 500 µm, about 550 µm, about 600 µm, about 650 µm, about 700 µm, about 750 µm, about 800 µm, about 850 µm, about 900 µm, about 950 µm, about 1000 µm, about 1050 µm, about 1100 µm, about 1150 µm, about 1200 µm, about 1250 µm, about 1300 µm, about 1350 µm, about 1400 µm, about 1450 µm, or about 1500 µm, including any ranges between any of these values. In particular embodiments, the average particle size range is from about 0.3 mm to 1.1 mm.

In some embodiments, the MIP beads of the present disclosure have a substantially unimodal particle size distribution. In other embodiments, it may be desirable for the MIP beads to have a bimodal or other multimodal particle size distribution.

In many processes, material handling or mass flow requirements dictate that the percentage of fine particles be low. Accordingly, in particular embodiments, less that about 10% of the MIP beads of the present disclosure have a particle size less than about 250 µm. In other embodiments, less than about 5% or less than about 1% of the beads have a particle size less than about 250 µm. The average particle size of the beads may be measured by various analytical methods generally known in the art including, for example, ASTM D 1921-06.

Alternatively, the molecularly imprinted polymer can be in a non-bead form, such as nanowires, thin films or membranes, or powders. MIPs according to the disclosure can be used as ionophores in liquid electrodes or as coatings for graphite electrodes to provide highly sensitive MIP ion-selective electrodes for detection of a variety of drugs and other chemical compounds.

In most embodiments, it is desirable that the beads of the present disclosure be porous to facilitate mass flow in and out of the bead. In particular embodiments, the MIP beads of the present disclosure are characterized as "macroreticular" or "macroporous," which refers to the presence of a network of pores having average pore diameters of greater than 100 nm. In various embodiments, polymer beads with average pore diameters ranging from 100 nm to 2.4 µm are prepared.

In some embodiments the average pore diameters can be about 100 nm, about 200 nm, about 300 nm, about 400 nm, about 500 nm, about 600 nm, about 700 nm, about 800 nm, about 900 nm, about 1000 nm, about 1100 nm, about 1200 nm, about 1300 nm, about 1400 nm, about 1500 nm, about 1600 nm, about 1700 nm, about 1800 nm, about 1900 nm, about 2000 nm, about 2100 nm, about 2200 nm, about 2300 nm, or about 2400 nm, including ranges between any of these values.

The beads can also be mesoporous, or include mesopores (in addition to macropores). The term "mesoporous" refers to porous networks having an average pore diameter from 10 nm to 100 nm. In some embodiments mesopore average pore diameters can be about 10 nm, about 15 nm, about 20 nm, about 25 nm, about 30 nm, about 35 nm, about 40 nm, about 45 nm, about 50 nm, about 55 nm, about 60 nm, about 65 nm, about 70 nm, about 75 nm, about 80 nm, about 85 nm, about 90 nm, about 95 nm, or about 100 nm, including any ranges between any of these values.

In addition, the beads can also be microporous, or include micropores in addition to macropores and/or mesopores. The term "microporous" refers to porous networks having an average pore diameter less than 10 nm. In some embodiments micropore average pore diameters can be about 0.5 nm, about 1 nm, about 1.5 nm, about 2 nm, about 2.5 nm, about 3 nm, about 3.5 nm, about 4 nm, about 4.5 nm, or about 5 nm, or about 5.5 nm, about 6 nm, about 6.5 nm, about 7 nm, about 7.5 nm, about 8 nm, about 8.5 nm, about 9 nm, about 9.5 nm, or about 10 nm, including ranges between any of these values.

The macroreticular polymer beads have a surface area of about 0.1 to about 500 $m^2/g$, for example about 0.1, about 0.5, about 1, about 5, about 10, about 15, about 20, about 30, about 40, about 50, about 60, about 70, about 80, about 90, about 100, about 150, about 200, about 250, about 300, about 350, about 400, about 450, or about 500 $m^2/g$, inclusive of all ranges and subranges therebetween.

The structure and porosity of the beads are determined principally by the conditions of polymerization. The desired porosity of the bead can be achieved by the choice of surrogate/ligand monomer complex, non-ligand monomer and crosslinking agents and their amounts, as well as the composition of the reaction solvent(s) and optional pore forming additives or thixotropic agents. Porosity determines the size of the species, molecule or ion that may enter a specific structure and its rate of diffusion and exchange, as well as the rate of mass flow in and out of the bead structure.

The thixotropic agents can significantly improve control of bead formation and substantially uniform bead or particle size. Suitable thixotropic agents employed herein are dependent on the type and amount of monomer employed and the suspending medium. The thixotropic agents can also advantageously act as suspension agents during the suspension polymerization process. Representative examples of such thixotropic agents include, but are not limited to, cellulose ethers such hydroxyethylcellulose, (commercially available under the trade name of "CELLOSIZE"), cross-linked polyacrylic acid such as those known under the name of "CARBOPOL" polyvinyl alcohols such as those known under the trade name of "RHODOVIOL", boric acid, gums such as xanthan gum and the like and mixtures thereof, The amount of thixotropic agents can influence the size of the resin (i.e., the use of larger amounts of thixotropic agents often results in the formation of smaller resin particles).

The amount of the thixotropic agent is generally from about 1.5 to about 5 weight percent, based on the weight of the monomers in the monomer mixture. In some embodiments, the amount of the thixotropic agent is from about 1.5 to about 2.5 weight percent, based on the weight of the monomer or monomers (combination of monomers) in the monomer mixture.

The beads of the present disclosure can be prepared by various polymerization techniques. A polymer matrix can then be formed via a suitable polymerization technique in the presence of the surrogate/ligand monomer complex to form an imprinted resin. The resin product can be then be recovered. Non-limiting examples of suitable polymerization techniques can include aqueous suspension polymerization, inverse suspension polymerization (e.g. in perfluorocarbon), non-aqueous dispersion polymerization, two-stage swelling polymerization, aerosol polymerization, latex seeded emulsion polymerization, electropolymerization, and bulk polymerization on porous bead substrates. In one embodiment, the polymerization method is the aqueous suspension polymerization of a copolymerizable mixture of an organic phase containing non-ligand monomer, an optional crosslinker, and the surrogate/ligand monomer complex, and an aqueous phase containing at least one or more thixotropic agents.

Non-covalent electropolymerized molecular imprinted polymers (E-MIPs) according to the disclosure can be used as chemosensitive ultrathin films with high selectivity for the detection of drugs and other chemicals. Electropolymerization is one of the strategies for the preparation of MIP modified electrodes. A MIP film with special selectivity is deposited on the surface of the detector, which can be used, for example, for the analysis of proteins from biological fluids or in pharmaceutical, agricultural, food and environmental (e.g., water treatment) analysis.

In certain embodiments of the present disclosure, a MIP is prepared by suspension polymerization of a surrogate/ligand monomer complex and other monomers as described herein. In the suspension polymerization procedure, the various phases can be thoroughly mixed separately prior to the start of the reaction and then added to the polymerization reaction vessel. While this mixing of the ingredients can be done in a vessel other than the reaction vessel, the mixing can alternatively be conducted in the polymerization reaction vessel under an inert atmosphere, particularly where the monomers being employed are subjected to oxidation. Further, in order to improve yields and selectivity of the final resin product, it is desirable that the ligand monomer be hydrolytically stable under polymerization conditions and in the final product. For example, the ligand monomer can be hydrolytically stable in a suspension polymerization formulation and under a water treatment environment such that hydrolysis is substantially avoided during polymerization and the useful life of the resin.

The polymerizable ligand/surrogate complex of the present disclosure can be polymerized under suspension polymerization conditions where the aqueous phase contains thixotropic agents such as polyvinyl alcohol and boric acid in water, and the organic phase comprises, for example, the polymerizable ligand/surrogate complex, styrene (non-ligand monomer), divinylbenzene (cross-linking monomer), organic solvents, and AIBN (initiator). The biphasic mixture is agitated, for example with a stirrer. By varying the temperature, agitation, polymerizable ligand/surrogate loading, solvent ratios, and degree of cross-linking, different beads structures and properties can be obtained. For example, spherical and porous beads of the desired size can be obtained by controlling the agitation or stirring during the polymerization. When the polymerization mixture is agitated to disperse the monomers dissolved in the organic reaction medium as droplets within the aqueous phase, suitably the droplets are of such size that when transformed into polymer beads, they are substantially spherical and porous, and of the desired size. Unsuitable reaction conditions can lead to the formation of no or very small beads, high surrogate losses to the aqueous phase, low overall yield, and insufficient porosity such that there is poor mass transfer to the complexing cavity. In a particular embodiment, the ligand monomer is a polymerizable ammonium salt, such as one of the polymerizable ammonium salts disclosed herein, and the surrogate is an anion, for example one of the anions disclosed herein. In more particular embodiments, the ligand monomer is a polymerizable 4-vinylbenzylammonium salt and the surrogate is thiocyanate, pentathionate, isophthalate, phosphate, or succinate.

Polymerization can be carried out at any suitable temperature. In some embodiments, the reaction is carried out at an elevated temperature, for example above about 50° C. in the presence of an optional initiator. Suitable initiators that can be used include but are not limited to benzoyl peroxide, diacetylperoxide, and azo-bisisobutyronitrile (AIBN). The amount of initiator employed can be within the range of about 0.005 to about 1.00% by weight, based on the weight of the monomer being polymerized. In the presence of an initiator, the temperature of reaction is maintained above that at which the initiator becomes active. Lower temperatures, e.g. about −30° C. to about 200° C., can be employed if high energy radiation is applied to initiate polymerization. Styrenic polymerizations can be thermally initiated.

Proper and sufficient agitation or stirring throughout the polymerization typically provides substantially spherical and porous beads having the desired size. For example, the polymerization mixture can be agitated to disperse the monomers (dissolved in the solvent organic phase) in the aqueous solvent phase by shear action, thereby forming droplets. By selecting the proper level of agitation, the droplets can be of such size that when transformed into polymer beads, they are substantially spherical and porous, and will have the desired size as discussed herein.

Various means are available to maintain the proper agitation. When polymerization is conducted in a reactor made of stainless steel, such reactor can be fitted with a rotatable shaft having one or more agitator blades. When a round-bottom flask is used as a reactor, an overhead stirrer can be used to agitate the reaction medium. The amount of agitation necessary to obtain the desired results will vary depending upon the particular monomers being polymerized, as well as the particular polymer bead size desired. Therefore, the agitation speed such as the rpm (revolutions per minute) may be regulated within certain limits. Polymerization times can vary from about 3 hours to about 72 hours, depending on the reactivity of the monomers.

When polymerization is complete, the surrogate can be removed from the typically cross-linked polymer beads without substantially affecting the complexing cavity. Removal of the surrogate molecule provides e.g. a bead having a porous structure with complementary molecular cavities therein that has high binding affinity for the target molecule (or ion). For example, when the surrogate is thiocyanate (for providing a dicyanoargentate or dicyanoaurate selective cavity), the thiocyanate can be removed ("stripped") from the binding site in the beads by flushing with a $Fe_2(SO_4)_3$ solution to provide a ligand/sulfate complex suitable for sequestering dicyanoargentate or dicyanoaurate from e.g. a mining leach process.

In embodiments wherein the surrogate molecule is covalently bound to the ligand, any appropriate method can be used to cleave the covalent bond between the surrogate and ligand, although the covalent bond formed should preferably be cleaved under conditions suitable to release the surrogate molecule after the MIP is formed, without adversely affecting the selective binding characteristics of the MIP. To accomplish this, acetone, isopropanol, methanol or other suitable organic solvent may be used to swell the resultant polymers, allowing greater access to the coordinated surrogate. The covalent bond can be cleaved by large changes in pH or by the addition of large amounts of a competing molecule to release the surrogate.

The MIP materials of the present disclosure can be reused (regenerated) more than once and frequently up to about 30 times or more, depending on the particular resin and the treated liquid medium. Regeneration can be accomplished in much the same manner as removal of the original imprint ion, e.g. stripping or washing with an appropriate solution.

Macroreticular MIP beads are particularly useful for selectively removing or adsorbing target dissolved species from solutions, for example water streams, e.g., drinking water, lakes, streams, industrial effluent streams, mining extraction and waste streams, etc. In one embodiment, the MIP beads of the present disclosure are prepared from ligand monomers which are ionic, for example cationic (for complexing to anions) or anionic (for complexing to cations).

In a particular embodiment, the MIP beads of the present disclosure are useful for sequestering precious metals, such as gold (Au) or silver (Ag) from mining operations. The mining of precious metals such as gold or silver typically crushing the gold and/or silver ore, and then extracted the crushed ore with concentrated cyanide solutions (often under pressure) to form an aqueous solution containing soluble cyanide complexes, for example $Au(CN)_2^-$ and $Ag(CN)_2^-$, in addition to other contaminants such as $Hg(CN)_4^{2-}$ and inter alia various copper, nickel, zinc, cobalt, chromium, and iron salts. Alternative extraction processes can form other soluble precious metal salts such as $AuCl_4^-$ and $Au(S_2O_3)_2^{3-}$ (as well as various salts of other contaminating metal species). Conventionally, the soluble gold or silver complexes are extracted with activated carbon, eluted from the activated carbon, and then electrolyzed to the metallic form.

In one of the embodiments the MIPs of the present disclosure can be useful for detection and/or removal of rare earth metals (REMs) or elements (REEs). Due to the fact that the physico-chemical properties of REEs are very similar, their separation from each other can be very difficult using conventional separation methods.

REMs or REEs of the present disclosure is defined as one of a set of seventeen chemical elements in the periodic table, specifically the fifteen lanthanides (e.g., cerium (Ce), dysprosium (Dy), erbium (Er), europium (Eu), gadolinium (Gd), holmium (Ho), lanthanum (La), lutetium (Lu), neodymium (Nd), praseodymium (Pr), promethium (Pm), samarium (Sm), terbium (Tb), thulium (Tm), ytterbium (Yb) as well as scandium (Sc) and yttrium (Y).

Roughly 60% of all gold produced annually has been through some variation of the Gold-Cyanide Process (GCP). For suitable GCP solutions activated carbon is the most common sequestering substrate for the removal of dicyanoaurate, accounting for over half of all gold extracted (or over 1250 tons in 2004). Activated carbon is cheap to manufacture, absorbs gold readily, is fairly selective for gold, and has a large gold loading capacity. Unfortunately, activated carbon also has a high affinity for mercury (II) tetracyanide and under some conditions mercury (II) tetracyanide may actually displace dicyanoaurate from the activated carbon. Additionally, regeneration of activated carbon is energy intensive and requires a fair amount of capital layout. Like dicyanoargentate (the silver species found in GCP), mercury (II) tetracyanide desorbs with dicyanoaurate when eluted from the activated carbon. Mercury (II) tetracyanide is also reduced to elemental mercury during the electrowinning process that isolates metallic gold.

Furthermore, the elution process is not 100% efficient for activated carbon and some traces of mercury remain on the activated carbon. Subsequently, upon thermal reactivation of the activated carbon, the mercury is thermally reduced to mercury metal, which then volatilizes and escapes into the atmosphere. The reactivation step is unavoidable as activated carbon also absorbs organic matter, which can foul and substantially reduce its capacity.

Accordingly, the recoverable capacity of activated carbon (i.e., the effective capacity based on the amount of gold ultimately recovered after elution) can be quite low (as low as 1 g Au/kg C, but more typically 3-4 g Au/kg C) due to difficulties in eluting the gold, or due to the presence of competing contaminants in the GCP (such as organics, mercury and copper salts). This low recoverable capacity results in significant process costs (e.g., a majority of capital costs and the bulk of the operating costs) as it requires large carbon beds, and frequent wash cycles to recover the gold and/or silver salts. Accordingly, more efficient and selective adsorbents for gold and silver extraction processes, which elute the gold and silver salts more readily and under milder conditions would significantly reduce the capital and operating costs in precious metal mining (and subsequent extraction) processes. The MIP absorbents of the present disclosure provide such improved absorbents.

Conventional ion exchange resins have also been evaluated as more selective and higher capacity absorbents for sequestering soluble precious metal complexes. However, while the capacity of anion exchange resins such as Dowex 1 and Amberlite IRA 900 RF are higher (~5-7 g Au/kg resin, vs. ~3-4 g Au/kg C), these resins are substantially more expensive compared to carbon absorbents. For example, bulk activated carbon costs approximately $1-2 per kg, whereas Dowex 1 or Amberlite IRA 900 RF can cost from $50 to $160 per kg, respectively. Furthermore, such anion exchange resins can only be regenerated 5-25 times, and because large ion exchange beds are required to process the large fluid volumes typically encountered in gold mining leach streams, the overall capital and operating costs of an extraction process utilizing ion exchange resins is not markedly improved compared to conventional processes using carbon absorbents, as shown graphically in FIG. 2.

The MIP materials of the present disclosure, prepared using surrogates as a template rather than the target molecule as described herein, provide superior properties compared to conventional ion exchange resins. Conventional ion exchange materials can provide relatively high initial loadings of the target molecule, e.g. $Au(CN)_2^-$ and/or $Ag(CN)_2^-$, but the capacity decreases rapidly in use, requiring replacement after a relatively small number of elution cycles, and reducing the extraction capacity during use. Conventional ion exchange resins are readily "poisoned" by the presence of other metals like copper that are not removed during the elution cycle. In addition, conventional ion exchange resins can be sensitive to pH changes. Resin beads also swell and contract in use as the beads bind and release ions during regeneration. Over time and under particular external conditions (e.g., hydraulic shock, chlorine and chloramine degradation, fouling (particulate and organic), oxidation, osmotic shock from the regeneration process and basic attrition from backwash), etc. the beads can weaken and break down. In addition, the performance of conventional ion exchange resins is highly variable depending upon the ore content of the gold/silver-containing solution.

In contrast, the MIP materials of the present disclosure have high selectivity for gold and silver salts (95% or higher), have significantly higher capacity than conventional ion exchange resins (e.g., about 20-50 g Au/kg MIP resin), better retention of capacity and less variability of adsorption during use, and lower regeneration/elution costs. In addition, the MIP materials of the present disclosure are substantially less expensive to manufacture than MIP materials using the target molecule itself to template the complexing cavity, and are comparable or modestly more expensive than conventional ion exchange resins. As a result, the MIP materials of the present disclosure can provide substantially reduced capital and process costs relative to conventional processes designed around conventional absorbents (e.g., activated carbon, conventional ion exchange resins, conventional MIP resins template with the target molecule, etc.).

Conventional MIP beads for extracting precious metals have been proposed (e.g., U.S. Pat. No. 7,746,316), as the higher selectivity for precious metal ions allows for smaller bed volumes of MIP beads compared to conventional ion exchange resins (or carbon), but since conventional MIP beads are prepared using the target precious metal ions as templates for the MIP beads, the cost of preparing the large quantities of MIP beads required is prohibitive. In addition, gold and silver dicyanate complexes are toxic and the monomer ligand/dicyanoaurate or dicyanoargentate complexes difficult to work with in large quantities. Accordingly, there has been no practical or commercially viable way to make MIP beads at the scales required to treat gold and silver leach streams.

Furthermore, even though MIP beads prepared using a surrogate as disclosed herein are theoretically less selective than those prepared using the target ion as a template, the MIP beads of the present disclosure provide substantial cost savings compared to conventional absorbents such as activated carbon or conventional ion exchange resins. In mining operations the MIP beads of the present disclosure can increase overall extraction by between three (3) to five (5) % and can reduce operating costs by as much as 60%. These resin beads can essentially be plug-substituted to a plant's current operations without plant redesign. Moreover, due to their lower manufacturing cost compared to conventional MIP materials, the "surrogate" MIP materials of the present disclosure are cost effective for the extraction of lower value metals (e.g., copper, lithium and the like) where conventional MIP materials would be prohibitively expensive.

For similar reasons, treating waste water streams with MIP beads to remove toxic and/or radioactive metal complexes (e.g., $Hg(CN)_4^{2-}$, $UO_2(CO_3)_2^{2-}$, $VO_4^{3-}$, etc.) is impractical and not commercially feasible with conventional MIP beads prepared using these target ions to template the MIP beads, again, because the scale of the respective treatment processes would require correspondingly large amounts of these hazardous metal complexes in the MIP production process.

Such scale-up problems in preparing MIP absorbents can be circumvented by replacing the respective target ion as the template in preparing the MIP with a carefully selected surrogate ion of approximately the same shape, size and charge as the target ion, so as to create complexing cavities in the MIP similar to those which would have been created using the target ion itself as the template. However, the surrogates are less expense and more readily available than the target ion, less toxic, form sufficiently stable complexes with the ligand monomer and otherwise do not compromise the ability to polymerize the MIP. For example a suitable surrogate for preparing molecularly imprinted polymers suitable for selectively binding $Au(CN)_2^-$, $Ag(CN)_2^-$ or $AuCl_4^-$ is thiocyanate. A suitable surrogate for preparing molecularly imprinted polymers suitable for selectively binding $Au(S_2O_3)_2^{3-}$ is pentathionate. A suitable surrogate for preparing molecularly imprinted polymers suitable for selectively binding $Hg(CN)_4^{2-}$ is isophthalate. A suitable surrogate for preparing molecularly imprinted polymers suitable for selectively binding $VO_4^{3-}$ is phosphate. A suitable surrogate for preparing molecularly imprinted polymers suitable for selectively binding $UO_2(CO_3)_2^{2-}$ succinate.

In conventional processes, the goal has typically been to maximize the selectivity of the absorbent for the desired target species to be removed or sequestered. This is particularly true for processes using MIP materials as absorbents, as the MIP materials exhibit extremely high selectivity for the target molecule used as a template in the preparation of the MIP material. However, the additional selectivity provided by a MIP material prepared using the target molecule as a template (i.e., conventional MIP materials) does not translate into a significant process advantage, particularly if the target molecule used to template the MIP material is expensive, toxic, difficult to obtain, or interferes with polymerization of the MIP material itself. Such factors can dramatically increase the cost of manufacturing the MIP material, and thereby offset any processing advantages provided by the higher selectivity.

The present applicants have found that in many processes, it is sufficient to provide a MIP material that is significantly more selective for the desired target molecule than the other species in solution, or alternatively stated, a MIP material which is substantially less selective, or excludes, non-target species in the mixture to be separated.

The MIP materials (e.g., beads or macroreticular beads) prepared using suitable surrogates rather than the target molecule (e.g., ion) are selective for the target molecule (e.g., ion). The selectivity of the MIP material to bind specie "A" in a mixture of "A" and specie "B" can be characterized by a "selectivity coefficient" using the following relationship:

$$\text{Selectivity coefficient for } A = \frac{[A'][B]}{[A][B']}$$

where "[A]" and "[B]" refer to the molar concentration of A and B in solution, and "[A']" and "[B']" refer to the concentration of complexed "A" and "B" in the MIP material.

For conventional MIP materials, prepared using the target molecule to template the complexing cavity, the selectivity coefficient for the target molecule would be higher than other species, as the complexing cavity is optimally configured for the shape, size, charge, etc. of the target molecule. For MIP materials prepared according to the present disclosure, using a surrogate molecule instead of the target molecule to template the MIP material, the selectivity coefficient for the surrogate molecule would be higher than, e.g., the target molecule, but the selectivity of the MIP material for the target molecule would still be significantly higher than for other dissolve species in the mixture to be separated. For most separations, the selectivity coefficient for the target ion versus other species in the mixture to be separated should be at least about 10, at least about 11, at least about 12, at least about 13, at least about 14, at least about 15, at least about 20, at least about 25, at least about 30, at least about 35, at least about 40, at least about 45, at least about 50, at least about 55, at least about 60, at least about 70, at least about 80, at least about 90, at least about 100, at least about 200, at least about 300, at least about 400, at least about 500, including ranges between any of these values.

As used herein, the term "bind," "binding," "bond,", "bonded," or "bonding" refers to the physical phenomenon of chemical species being held together by attraction of atoms to each other through sharing, as well as exchanging, of electrons or protons. This term includes bond types such as: ionic, coordinate, hydrogen bonds, covalent, polar covalent, or coordinate covalent. Other terms used for bonds such as banana bonds, aromatic bonds, or metallic bonds are also included within the meaning of this term. The selective binding interactions refer to preferential and reversible binding exhibited by the MIP for an ion (anion or cation), as described herein.

One of the embodiments of the present disclosure relates to a plurality of macroreticular polymer beads comprising a copolymer having a plurality of complexing cavities which selectively bind a target metal ion, wherein the copolymer is prepared from:

(a) a ligand monomer which is cationic or anionic and is complexed to a non-metal surrogate ion, (b) an non-ligand monomer, and a crosslinking monomer;

wherein:

(i) the charge of the copolymer in the complexing cavity is opposite the charge of the target metal ion, and (ii) the non-metal surrogate ion has substantially the same shape and charge as the target metal ion.

The ligand monomers of the present disclosure include monodentate, bidentate, and polydentate ligands. The amount and type of ligands needed for a given cationic or anionic molecularly imprinted polymer bead would depend on the number of coordination sites available on the target compound and the associated ligands. Numerous combinations are possible. For example, a target cationic ligand complex may contain a target compound with 4 coordination sites. This target compound could form a number of combinations with a monodentate ligand or a bidentate ligand. The target compound could then bond to 1 to 4 monodentate ligands or 1 to 2 bidentate ligands, assuming each ligand fully coordinates with the target compound. Of course, the methods of the present disclosure contemplate partial coordination by the ligand and/or target compound. For example, the target ligand complex could have 1 to 4 monodentate ligands or 1 to 4 bidentate ligands. Those skilled in the art can form multiple combinations of ligands and target compounds based on the physical and chemical properties of each and the disclosure herein. In one embodiment, a mixture of ligands can be used to bind a specific target compound.

The target cation ligand complex can be formed by a combination of ligands and target compounds that provides an overall stable complex. The methods of the present disclosure include target cationic ligand complexes that limit side oxidation/reduction (redox) reactions during polymerization. In one embodiment, the target cationic ligand complex has a redox potential of at least 0.3 eV versus SCE (standard calomel electrode). Additionally, the target cation ligand complex can be formed at various pH ranges. In one embodiment, the target cationic ligand complex can be formed in a pH range of 1 to 13. In another embodiment, the target cationic ligand complex can be polymerized in a pH range of 5 to 9.

In some embodiments, the ligand molecule is a hard base ligand featuring a polymerizable group, e.g., a vinyl group.

In various embodiments, the ligand monomers of the present disclosure have one or more cationic functional groups. Such cationic ligands can be, but are not limited to, cationic oxygen containing heterocyclics, cationic nitrogen containing heterocyclics, cationic sulfur containing heterocyclics, cationic phosphorous containing heterocyclics, ammonium salts, phosphonium salts, acylinium salts, metallocenium salts, amidinium salts, imminium salts, trityl salts, pyridinium salts, pyrollidinium salts, imidizolium salts, guanidinium salts, phosphonium salts, sulfonium salts, or mixtures thereof. In particular embodiments, the cationic ligands are ammonium salts, such as alkyl and/or substituted alkyl ammonium salts. In one embodiment, the ligand can be 4-vinylbenzyl-N,N-dimethyl-N-decylammonium, 4-vinylbenzyl-N-decyl-N-methyl-D-glucammonium, N-methyl vinylpyridinium, or 4-vinylbenzyl-N,N-dimethyl-D-glucammonium.

The polymerizable groups of the ligand monomers can include any conventional in the art, for example vinyl, styryl, acryloyl, methacryloyl, etc., or any of the polymerizable groups for any of the monomers disclosed herein.

In other embodiments, the ligand monomer is a 4-vinylbenzyl ammonium compound such as N,N,N-tripentyl-N-(4-vinylbenzyl) ammonium salts, or N,N-dimethyl-N-decyl-N-(4-vinylbenzyl) ammonium salts.

In one embodiment, N-methylvinylpyridinium and 4-vinylbenzyl-N,N-dimethyl-D-glucammonium can be used in a reverse suspension polymerization reaction.

4-vinylbenzyl-N,N-dimethyl-N-decylammonium have shown particularly good results for use in removal of gold-containing cations from water (U.S. Pat. No. 7,476,316). In another embodiment, 4-vinylbenzyl-N,N-dimethyl- N-decylammonium and 4-vinylbenzyl-N-decyl-N-methylg-lucammonium can be used in a suspension polymerization reaction.

In some embodiments, the non-metal surrogate ion is an organic anion. Non-metal or organic surrogate ions of the present disclosure have substantially the same shape and charge as the target metal ions.

Substantially the same size and shape means that space filling models of the target molecule (e.g., a target anion) and the surrogate (e.g. a non-metal surrogate ion/organic anion) if superimposed on each other such that the overlap between the volumes defined by the space filling models is maximized (e.g. determined by means of commercial molecular modeling programs such as ChemBioDraw® Ultra 14.0) would differ by no more than about 50%, for example, no more than about 50%, no more than about 45%, no more than about 40%, no more than about 35%, no more than about 30%, no more than about 25%, no more than about 20%, no more than about 15%, the more than about 10%, or no more than about 5%, inclusive of all ranges and subranges therebetween.

Alternatively, a surrogate which is substantially the same size and shape as the target molecule can be functionally defined by the selectivity of the resulting MIP material for the target molecule (e.g., target ion). Since the complexing cavity of the inventive MIP materials is templated by a surrogate molecule rather than the target molecule, the selectivity for the MIP material for the surrogate material would be higher than for the target molecule. However, to the extent that the size and shape of the surrogate molecule would be substantially the same as the size and shape of the target molecule, the resulting MIP material would have a relatively high selectivity coefficient for the target molecule. Accordingly, higher selectivities for the target molecule would be indicative that the sizes and shapes of the target and surrogate molecules are substantially similar. In some embodiments the selectivity coefficient of the MIP materials of the present disclosure for the target molecule, templated with a surrogate molecule, are greater than about 10. In other embodiments, the selectivity coefficient of the MIP materials of the present disclosure are greater than: about 15, about 20, about 25, about 30, about 35, about 40, about 45, about 50, about 100, about 150, about 200, about 300, about 400, about 500, about 600, about 700, about 800, about 900, or about 1000, inclusive of all ranges therebetween.

As discussed herein, the selectivity of the complexing cavity for the target molecule depends on the appropriate selection of a surrogate having substantially the same size, shape, and physicochemical interaction with the ligand monomer. Applicants have found that the selection of the ligand monomer can also affect the selectivity the complexing cavity. For example, if the target molecule is a anion (e.g. an anionic metal complex), the cationic ligand monomer can include polymerizable ammonium salts. The selection of substituent groups on the ammonium functional group can affect the ultimate selectivity of the complexing cavity for the target ion, as well as affect the solubility and polymerization characteristics of the monomer ligand/surrogate complex. More particularly, when the target metal ion is $Au(CN)_2^-$ or $Ag(CN)_2^-$ and the non-metal surrogate ion is thiocyanate, the ligand monomer N,N,N-tripentyl-N-(4-vinylbenzyl) ammonium provides improved MIP properties compared to relatively similar ligand monomers in which one or more of the N-pentyl groups is replaced with another alkyl group. Similarly, when the target metal ion is $Au(S_2O_3)_2^{3-}$ and the non-metal surrogate ion is pentathionate, the ligand monomer N,N-dimethyl-N-decyl-N-(4-vinylbenzyl) ammonium provides improved MIP properties compared to relatively similar ligand monomers in which with one or more of the N-methyl or the N-decyl group is replaced with another alkyl group.

The MIP materials of the present disclosure are suitable for selectively binding target molecules. In particular embodiments, the target molecules are ionic, and the MIP materials have ligands with complimentary (opposite) charges, whereby the MIP material can complex with the target ion. Suitable target ions can be any metal salt, for example but not limited to, halides, cyanides, sulfates, chlorides, thiosulfates, carbonates, etc. of transition metals, oxyanions of antimony, oxyanions of arsenic, oxyanions of beryllium, oxyanions of bromine, oxyanions of carbon, oxyanions of chlorine, oxyanions of chromium, oxyanions of nitrogen, oxyanions of phosphorous, oxyanions of selenium, oxyanions of sulfur, oxyanions of manganese, oxyanions of technetium, oxyanions of boron, oxyanions of vanadium, molybdenum anions, tungsten anions, and mixtures thereof. In one embodiment, the target molecule can be arsenate salts, arsenite salts, nitrate salts, nitrite salts, cyanide salts, dicyanoaurate dicyanoargentate, tetrachloroaurate, $Hg(CN)_4^{2-}$, $VO_4^{3-}$, or $UO_2(CO_3)_2^{2-}$.

A specific and non-limiting non-metal surrogate ion for $Au(CN)_2^-$, $Ag(CN)_2^-$, or $AuCl_4^-$ is thiocyanate. A specific and non-limiting non-metal surrogate ion for $Au(S_2O_3)_2^{3-}$ is pentathionate. A specific and non-limiting non-metal surrogate ion for $Hg(CN)_4^{2-}$ is isophthalate. A specific and non-limiting non-metal surrogate ion for $VO_4^{3-}$ is phosphate. A specific and non-limiting non-metal surrogate ion for $UO_2(CO_3)_2^{2-}$ is succinate.

In some of the embodiments the target metal ion is an anionic metal complex. The target metal ion can be selected form the group consisting of $Au(CN)_2^-$, $Ag(CN)_2^-$, $AuCl_4^-$, $Au(S_2O_2)_2^{3-}$, $Hg(CN)_4^{2-}$, $UO_2(COs)_2^{2-}$, $VO_4^{3-}$, and combinations thereof. In some embodiments the target metal ion comprises a precious metal.

In some embodiments macroreticular polymer beads comprise a copolymer having a plurality of complexing cavities which selectively bind the target metal ion including $Au(CN)_2^-$, $Ag(CN)_2^-$, and wherein the copolymer is prepared from a cationic ligand monomer.

In some embodiments, the target metal ion is $Au(CN)_2^-$ or $Ag(CN)_2^-$ and the non-metal surrogate ion is thiocyanate.

In some embodiments, the target metal ion is $Au(S_2O_3)_2^{3-}$ and the non-metal surrogate ion is pentathionate.

Some embodiments relate to the target metal ion is $Hg(CN)_4^{2-}$ and the non-metal surrogate ion is isophthalate.

In other embodiments the target metal ion is $VO_4^{3-}$ and the non-metal surrogate ion is phosphate.

In certain embodiments the target metal ion is $UO_2(CO_3)_2^{2-}$ and the non-metal surrogate ion is succinate.

A wide variety of monomers may be used as a non-ligand monomer for synthesizing the MIP in accordance with the present disclosure. Suitable non-limiting examples of non-ligand monomers that can be used for preparing a MIP of the present disclosure include methylmethacrylate, other alkyl methacrylates, alkylacrylates, allyl or aryl acrylates and methacrylates, cyanoacrylate, styrene, substituted styrenes, methyl styrene (multisubstituted) including 1-methylstyrene; 3-methylstyrene; 4-methylstyrene, etc.; vinyl esters, including vinyl acetate, vinyl chloride, methyl vinyl ketone, vinylidene chloride, acrylamide, methacrylamide, acrylonitrile, methacrylonitrile, 2-acetamido acrylic acid; 2-(acetoxyacetoxy) ethyl methacrylate; 1-acetoxy-1,3-butadiene; 2-acetoxy-3-butenenitrile; 4-acetoxystyrene; acrolein; acrolein diethyl acetal; acrolein dimethyl acetal; acrylamide;

2-acrylamidoglycolic acid; 2-acrylamido-2-methyl propane sulfonic acid; acrylic acid; acrylic anhydride; acrylonitrile; aeryloyl chloride; 1-α-acryloyloxy-β,β-dimethyl-γ-butyrolactone; N-acryloxy succinimide acryloxytris(hydroxymethyl)amino-methane; N-acryloyl chloride; N-acryloyl pyrrolidinone; N-acryloyl-tris(hydroxymethyl)amino methane; 2-aminoethyl methacrylate; N-(3-aminopropyl)methacrylamide; (o, m, or p)-amino-styrene; t-amyl methacrylate; 2-(1-aziridinyl)ethyl methacrylate; 4-benzyloxy-3-methoxystyrene; 2-bromoacrylic acid; 4-bromo-1-butene; 3-bromo-3,3-difluoropropane; 6-bromo-1-hexene; 3-bromo-2-methacrylonitrile; 2-(bromomethyl)acrylic acid; 8-bromo-1-octene; 5-bromo-1-pentene; cis-1-bromo-1-propene; -bromostyrene; p-bromostyrene; bromotrifluoro ethylene; (+)-3-buten-2-ol; 1,3-butadiene; 1,3-butadiene-1,4-dicarboxylic acid 3-butenal diethyl acetal; 1-butene; 3-buten-2-ol; 3-butenyl chloroformate; 2-butylacrolein; t-butylacrylamide; butyl acrylate; butyl methacrylate; (o, m, p)-bromo styrene; t-butyl acrylate; 1-carvone; (S)-carvone; (−)-carvyl acetate; 3-chloroacrylic acid; 2-chloroacrylonitrile; 2-chloroethyl vinyl ether; 2-chloromethyl-3-trimethylsilyl-1-propene; 3-chloro-1-butene; 3-chloro-2-chloromethyl-1-propene; 3-chloro-2-methyl propene; 2,2-bis(4-chlorophenyl)-1,1-dichloroethylene; 3-chloro-1-phenyl-1-propene; m-chlorostyrene; o-chlorostyrene; p-chlorostyrene; 1-cyanovinyl acetate; 1-cyclopropyl-1-(trimethylsiloxy)ethylene; 2,3-dichloro-1-propene; 2,6-dichlorostyrene; 1,3-dichloropropene; 2,4-diethyl-2,6-heptadienal; 1,9-decadiene; 1-decene; 1,2-dibromoethylene; 1,1-dichloro-2,2-difluoroethylene; 1,1-dichloropropene; 2,6-difluorostyrene; dihydrocarveol; (±)-dihydrocarvone; (−)-dihydrocarvyl acetate; 3,3-dimethylacrylaldehyde; N,N'-dimethylacrylamide; 3,3-dimethylacrylic acid; 3,3-dimethylacryloyl chloride; 2,3-dimethyl-1-butene; 3,3-dimethyl-1-butene; 2-dimethyl aminoethyl methacrylate; 1-(3-butenyl)-4-vinylbenzene; 2,4-dimethyl-2,6-heptadien-1-ol; 2,4-dimethyl-2,6-heptadienal; 2,5-dimethyl-1,5-hexadiene; 2,4-dimethyl-1,3-pentadiene; 2,2-dimethyl-4-pentenal; 2,4-dimethylstyrene; 2,5-dimethylstyrene; 3,4-dimethylstryene; 1-dodecene; 3,4-epoxy-1-butene; 2-ethyl acrolein; ethyl acrylate; 2-ethyl-1-butene; (±)-2-ethylhexyl acrylate; (±)-2-ethylhexyl methacrylate; 2-ethyl-2-(hydroxymethyl)-1,3-propanediol triacrylate; 2-ethyl-2-(hydroxymethyl)-1,3-propanediol trimethacrylate; ethyl methacrylate; ethyl vinyl ether; ethyl vinyl ketone; ethyl vinyl sulfone; (1-ethylvinyl) tributyl tin; m-fluorostyrene; o-fluorostyrene; p-fluorostyrene; glycol methacrylate (hydroxyethyl methacrylate); GA GMA; 1,6-heptadiene; 1,6-heptadienoic acid; 1,6-heptadien-4-ol; 1-heptene; 1-hexen-3-ol; 1-hexene; hexafluoropropene; 1,6-hexanediol diacrylate; 1-hexadecene; 1,5-hexadien-3,4-diol; 1,4-hexadiene; 1,5-hexadien-3-ol; 1,3,5-hexatriene; 5-hexen-1,2-diol; 5-hexen-1-ol; hydroxypropyl acrylate; 3-hydroxy-3,7,11-trimethyl-1,6,10-dodecatriene; isoamyl methacrylate; isobutyl methacrylate; isoprene; 2-isopropenylaniline; isopropenyl chloroformate; 4,4'-isopropylidene dimethacrylate; 3-isopropyl-a-a-dimethylbenzene isocyanate; isopulegol; itaconic acid; itaconalyl chloride; (±)-linalool; linalyl acetate; p-mentha-1,8-diene; p-mentha-6,8-dien-2-ol; methyleneamino acetonitrile; methacrolein; [3-(methacryloylamino)-propyl]trimethylammonium chloride; methacrylamide; methacrylic acid; methacrylic anhydride; methacrylonitrile; methacryloyl chloride; 2-(methacryloyloxy)ethyl acetoacetate; (3-meth-acryloxypropyl)trimethoxy silane; 2-(methacryloxy)ethyl trimethylammonium methylsulfate; 2-methoxy propene (isopropenyl methyl ether); methyl-2-(bromomethyl)acrylate; 5-methyl-5-hexen-2-one; methyl methacrylate; N,N' methylene bisacrylamide; 2-methylene glutaronitrite; 2-methylene-1,3-propanediol; 3-methyl-1,2-butadiene; 2-methyl-1-butene; 3-methyl-1-butene; 3-methyl-1-buten-1-ol; 2-methyl-1-buten-3-yne; 2-methyl-1,5-heptadiene; 2-methyl-1-heptene; 2-methyl-1-hexene; 3-methyl-1,3-pentadiene; 2-methyl-1,4-pentadiene; (±)-3-methyl-1-pentene; (±)-4-methyl-1-pentene; (±)-3-methyl-1-penten-3-ol; 2-methyl-1-pentene; methyl vinyl ether; methyl-2-vinyloxirane; methyl vinyl sulfone; 4-methyl-5-vinylthiazole; myrcene; t-nitrostyrene; 3-nitrostyrene; 1-nonadecene; 1,8-nonadiene; 1-octadecene; 1,7-octadiene; 7-25ctane-1,2-diol; 1-octene; 1-octen-3-ol; 1-pentadecene; 1-pentene; 1-penten-3-ol; t-2,4-pentenoic acid; 1,3-pentadiene; 1,4-pentadiene; 1,4-pentadien-3-ol; 4-penten-1-ol; 4-penten-2-ol; 4-phenyl-1-butene; phenyl vinyl sulfide; phenyl vinyl sulfonate; 2-propene-1-sulfonic acid sodium salt; phenyl vinyl sulfoxide; 1-phenyl-1-(trimethylsiloxy)ethylene; propene; safrole; styrene (vinyl benzene); 4-styrene sulfonic acid sodium salt; styrene sulfonyl chloride; 3-sulfopropyl acrylate potassium salt; 3-sulfopropyl methacrylate sodium salt; tetrachloroethylene; tetracyanoethylene; trans 3-chloroacrylic acid; 2-trifluoromethyl propene; 2-(trifluoromethyl)propenoic acid; 2,4,4'-trimethyl-1-pentene; 3,5-bis(trifluoromethyl)styrene; 2,3-bis(trimethylsiloxy)-1,3-butadiene; 1-undecene; vinyl acetate; vinyl acetic acid; 4-vinyl anisole; 9-vinyl anthracene; vinyl behenate; vinyl benzoate; vinyl benzyl acetate; vinyl benzyl alcohol; 3-vinyl benzyl chloride; 3-(vinyl benzyl)-2-chloroethylsulfone; 4-(vinyl benzyl)-2-chloroethyl sulfone; N-(p-vinylbenzyl)-N,N'-dimethyl amine; 4-vinyl biphenyl (4-phenylstyrene); vinyl bromide; 2-vinyl butane; vinyl butyl ether; 9-vinyl carbazole; vinyl carbinol; vinyl cetyl ether; vinyl chloroacetate; vinyl hloroformate; vinyl crotanoate; vinyl peroxcyclohexane; 4-vinyl-1-cyclohexene; 4-vinylcyclohexene dioxide; vinyl cyclopentene; vinyl dimethylchlorosilane; vinyl dimethylethoxysilane; vinyl diphenylphosphine; vinyl 2-ethyl hexanoate; vinyl 2-ethylhexyl ether; vinyl ether ketone; vinyl ethylene; vinyl ethylene iron tricarbonyl; vinyl ferrocene; vinyl formate; vinyl hexadecyl ether; vinylidene fluoride; 1-vinylquinoline; vinyl iodide; vinyllaurate; vinyl magnesium bromide; vinyl mesitylene; vinyl 2-methoxy ethyl ether; vinyl methyl dichlorosilane; vinyl methyl ether; vinyl methyl ketone; 2-vinyl naphthalene; 5-vinyl-2-norbomene; vinyl pelargonate; vinyl phenyl acetate; vinyl phosphonic acid, bis(2-chloroethyl)ester; vinyl propionate; 4-vinyl pyridine; 2-vinyl pyridine; 1-vinyl-2-pyrrolidinone; 2-vinylquinoline; 1-vinyl silatrane; vinyl sulfone; vinyl sulfonic acid sodium salt; a-vinyl toluene; p-vinyl toluene; vinyl triacetoxysilane; vinyl tributyl tin; vinyl trichloride; vinyl trichlorosilane; vinyl trichlorosilane (trichlorovinylsilane); vinyl triethoxysilane; vinyl triethylsilane; vinyl trifluoroacetate; vinyl trimethoxy silane; vinyl trimethyl nonylether; vinyl trimethyl silane; vinyl triphenyphosphonium bromide (triphenyl vinyl phosphonium bromide); vinyl tris-(2-methoxyethoxy) silane; vinyl 2-valerate and the like.

Acrylate-terminated or otherwise unsaturated urethanes, carbonates, and epoxies can also be used in the MIP. An example of an unsaturated carbonate is allyl diglycol carbonate. Unsaturated epoxies include, but are not limited to, glycidyl acrylate, glycidyl methacrylate, allyl glycidyl ether, and 1,2-epoxy-3-allyl propane.

Cross-linking (also crosslinking) agents or cross-linking monomers that impart rigidity or structural integrity to the MIP are known to those skilled in the art, and include di-, tri- and tetrafunctional acrylates or methacrylates, divinylbenzene (DVB), alkylene glycol and polyalkylene glycol diacrylates and methacrylates, including ethylene glycol dimethacrylate (EGDMA) and ethylene glycol diacrylate, vinyl or allyl acrylates or methacrylates, divinylbenzene, diallyldiglycol dicarbonate, diallyl maleate, diallyl fumarate, diallyl itaconate, vinyl esters such as divinyl oxalate, divinyl malonate, diallyl succinate, triallyl isocyanurate, the dimethacrylates or diacrylates of bis-phenol A or ethoxylated bis-phenol A, methylene or polymethylene bisacrylamide or 26ismuth-acrylamide, including hexamethylene bisacrylamide lanthanide or hexamethylene bismethacrylamide, di(alkene) tertiary amines, trimethylol propane triacrylate, pentaerythritol tetraacrylate, divinyl ether, divinyl sulfone, diallyl phthalate, triallyl melamine, 2-isocyanatoethyl methacrylate, 2-isocyanatoethylacrylate, 3-isocyanatopropylacrylate, 1-methyl-2-isocyanatoethyl methacrylate, 1,1-dimethyl-2-isocyanaotoethyl acrylate, tetraethylene glycol diacrylate, tetraethylene glycol dimethacrylate, triethylene glycol diacrylate, triethylene glycol dimethacrylate, hexanediol dimethacrylate, hexanediol diacrylate, divinyl benzene; 1,3-divinyltetramethyl disiloxane; 8,13-divinyl-3,7,12,17-tetramethyl-21H,23H-porphine; 8,13-divinyl-3,7,12,17-tetramethyl-21H,23H-propionic acid; 8,13-divinyl-3,7,12,17-tetramethyl-21H,23H-propionic acid disodium salt; 3,9-divinyl-2,4,8,10-tetraoraspiro[5,5]undecane; divinyl tin dichloride and the like.

The MIP must have sufficient rigidity so that the target ion may be easily removed without affecting the integrity of the polymer. In such cases where the polymer matrix is insufficiently rigid, crosslinking or other hardening agents can be introduced. In imprinted MIP, the cross-linker (cross-linking agent or monomer) fulfills three major functions: 1) the cross-linker is important in controlling the morphology of the polymer matrix, whether it is gel-type, macroporous or a microgel powder; 2) it serves to stabilize the imprinted binding site (complexing cavity); and 3) it imparts mechanical stability to the polymer matrix. In particular embodiments, high cross-link ratios are generally desired in order to provide permanently porous materials with adequate mechanical stability.

Any suitable conditions effective to polymerize the monomers of the present disclosure to produce an MIP without dissociating the ligand/surrogate complex may be used. The monomers of the present disclosure may be polymerized by free radical polymerization, and the like. Any UV or thermal free radical initiator known to those skilled in the art can be used in the preferred free radical polymerization. Examples of UV and thermal initiators include benzoyl peroxide, acetyl peroxide, lauryl peroxide, azobisisobutyronitrile (AIBN), t-butyl peracetate, cumyl peroxide, t-butyl peroxide; t-butyl hydroperoxide, bis(isopropyl) peroxy-dicarbonate, benzoin methyl ether, 2,2'-azobis(2,4-dimethyl-valeronitrile), tertiary butyl peroctoate, phthalic peroxide, diethoxyacetophenone, t-butyl peroxypivalate, diethoxyacetophenone, 1-hydroxycyclohexyl phenyl ketone, 2,2-dimethoxy-2-phenylacetophenone, and phenothiazine, diisopropylxanthogen disulfide, 2,2'-azobis-(2-amidinopropane); 2,2'-azobisisobutyronitrile-; 4,4'-azobis-(4-cyanovaleric acid); 1,1'-azobis-(cyclohexanecarbonitrile)-; 2,2'-azobis-(2, 4-dimethyl valeronitrile); and the like and mixtures thereof.

The choice of monomer and cross-linking agent will be dictated by the chemical (hydrophilicity, chemical stability, degree of cross-linking, ability to graft to other surfaces, interactions with other molecules, etc.) and physical (porosity, morphology, mechanical stability, etc.) properties desired for the polymer. The amounts of ligand monomer/surrogate complex, monomer and crosslinking agents should be chosen to provide a crosslinked polymer exhibiting the desired structural integrity, porosity and hydrophilicity. The amounts can vary broadly, depending on the specific nature/reactivities of the ligand/surrogate complex, monomer and crosslinking agent chosen as well as the specific application and environment in which the polymer will ultimately be employed. The relative amounts of each reactant can be varied to achieve desired concentrations of ligand/surrogate complexes in the polymer support structure. Typically, the amount of ligand surrogate complex will be on the order of about 0.01 mmol to about 100 mmol percent of monomer, including: about 0.02, 0.05, 0.1, 0.2, 0.3, 0.5, 1, 2, 3, 4, 5, 10, 15, 20, 25, 30, 35, 40, 45, 50, 55, 60, 65, 70, 75, 80, 85, 90, 95, or 100 mmole percent of monomer. The amount of cross-linker is typically on the order of about 1.0 to about 10 mmole percent, including about 1.5, 2, 3, 4, 5, 6, 7, 8, or 9 mmole percent of monomer. The amount of a free radical initiator can be about 0.005 to 1 mole percent, including about 0.01, 0.05, 0.1, 0.5, 0.6, 0.7, 0.8, or 0.9 mole percent of monomer. (Molar percentages refer to the percentage relative to the total amount of monomers prior to polymerization.)

The solvent, temperature, and means of polymerization can be varied in order to obtain polymeric materials of optimal physical or chemical features, for example, porosity, stability, and hydrophilicity. The solvent will also be chosen based on its ability to solubilize all the various components of the reaction mixture, and form a desirable polymer morphology.

The degree of crosslinking can range from about 1% to about 95%. In some embodiments, the degree of crosslinking is from about 5% to about 80%.

Any solvent which provides suitable solubility and is compatible with the desired reaction to the conditions to form the MIP materials of the present disclosure may be used. In some embodiments in which the MIP material is prepared by suspension polymerization conditions, the solvent can be a mixture of organic solvents. For example, the solvent can include long chain aliphatic alcohols such as pentanols, hexanols, heptanols, octanols, nonanols, decanols, undecanols, dodecanols, including saturated and unsaturated isomers thereof (e.g., methyl and ethyl pentanols, methyl and ethyl hexanols, methyl and ethyl, hepatanols, etc.), aliphatic hydrocarbons (e.g., butanes, pentanes, hexanes, heptanes, etc.), aromatic hydrocarbons (e.g., benzene, toluene, xylenes, etc.), and combinations thereof.

The resin thus obtained is in the form of porous beads. Porous beads can have an open cell structure such that the majority of open volumes within the bead are interconnected with one another and external openings on surfaces of the bead.

In one embodiment, the present disclosure provides a method of selectively sequestering one or more target metal ions from a solution of the one or more target metal ion ions admixed with other ions, comprising first contacting the macroreticular polymer beads of the present disclosure with a stripping solution, whereby the non-metal surrogate ions are removed from the macroreticular polymer beads, then contacting the stripped beads with the solution, thereby selectively sequestering the target ion in the macroreticular polymer beads. The sequestered target ion is then stripped from the beads with an ionic solution capable of displacing the target ion, thereby regenerating the beads for reuse in sequestering target ions.

In one embodiment, the target ion is dicyanoaurate (or dicyanoargentate) for example in a complex mixture obtained from the cyanide leech stream of a precious metal (e.g. gold or silver) mining operation, and the MIP material of the present disclosure is a macroreticular MIP bead prepared by polymerizing styrene, divinyl benzene, and N,N,N-tripentyl-N-(4-vinylbenzyl) ammonium thiocyanate. The beads are initially in the form of a thiocyanate salt. Before initial use, the thiocyanate anion is stripped out of the beads by contacting the beads with a solution of $Fe_2(SO_4)_3$, thereby providing beads in the "sulfate" form. These beads are then contacted with a cyanide leach solution containing the dicyanoaurate (or dicyanoargentate) ions (typically also including various Hg, Cu, Ni, Zn, and Fe ions). The dicyanoaurate (or dicyanoargentate) ions selectively bind to the beads. Upon reaching (or nearing) capacity, the beads are then stripped (e.g., with thiocyanate solution) to release gold, silver, and other trace metals, and then regenerated (e.g., using a solution of $Fe_2(SO_4)_3$) to for further use in sequestration. Unlike conventional gold sequestration processes using activated carbon, such a process is simpler as it eliminates the carbon reprocessing required for a conventional process, and the stripping (elution) step can be carried out under less rigorous conditions (e.g., lower temperature and pressure). See FIG. 3. This reduces both capital and operating costs for the overall process relative to the conventional activated carbon absorbent process.

Another embodiment of the present disclosure relates to sequestering tetrachloroaurate when chloride is used as a lixiviant for mining gold from refractory ores. The advantage of using chloride as a lixiviant is that it avoids the use of highly toxic cyanide solutions, and the subsequent disposal thereof. However, tetrachloroaurate (or oxychlorides thereof formed by hydrolysis when insufficient chloride is present) are notoriously difficult to elute from ion exchange resins, with long elution times and only modest amounts of gold recovered. Additionally, the most commonly used eluent, thiourea, is a suspected carcinogen, and is not desirable for large-scale use. Accordingly, this process has number of challenges for its widespread use in gold mining. Environmental factors, gold uptake efficiency, tetrachloroaurate sorption onto a substrate, and finally efficient elution of the gold from the substrate are all problematic issues for chloride. While the first three factors remain to be addressed, it is believed that an ionic MIP bead of the present disclosure, coupled with a new elution methodology may quickly and efficiently elute gold as its cyanide or thiocyanate form.

Tetrachloroaurate may be rapidly reduced from $Au^{3+}$ to $Au^+$ with a mild reducing agent, such as ascorbic acid or sulfite, which are capable of reducing $Au^{3+}$ to $Au^+$ and are relatively inexpensive, non-toxic, or otherwise compatible with the materials and process chemicals used in precious metal extraction processes. When the reduction of the gold by the reducing agent is performed in the presence of potassium cyanide, the resulting dicyanoaurate may be recaptured immediately, e.g., using a MIP material of the present disclosure, without loss of dicyanoaurate during reduction. The dicyanoaurate can then be eluted with thiocyanate, a proven and very fast system. Because of the highly selective nature of some ion-exchange resins other metals would not be reduced alongside of the gold and be subsequently eluted during the thiocyanate elution process.

The present disclosure provides methods for preparation of MIPs. MIPs can be prepared by modification of known techniques including but not limited to those described in U.S. Pat. Nos. 4,406,792, 4,415,655, 4,532,232, 4,935,365, 4,960, 762, 5,015,576, 5,110,883, 5,208,155, 5,310,648, 5,321,102, 30 5,372,719, 5,786,428, 6,063,637, and 6,593, 142, the entire contents of each of which are incorporated herein by reference in their entireties for all purposes.

The MIP materials of the present disclosure, particularly those prepared using thiocyanate as a surrogate for dicyanoaurate or dicyanoargentate, and N,N,N-tripentyl-N-(4-vinylbenzyl) ammonium as the polymerizable ligand are also particularly useful in sequestering dicyanoaurate or dicyanoargentate where the leach contains large amounts of dissolved solids, carbonaceous materials or significant amounts of mercury. The presence of carbonaceous materials in the leach is a particular problem for conventional sequestration processes relying on activated carbon as an absorbent, as the presence of carbonaceous materials significantly lowers the capacity of the activated carbon for dicyanoaurate. Similarly, mercury in the leach stream can reduce the capacity of conventional activated carbon or ion exchange absorbents by competing with dicyanoaurate for absorption sites in the absorbent. In contrast, the MIP materials of the present disclosure provide superior selectivity for dicyanoaurate, and are substantially less affected (or unaffected) by the presence of such contaminants.

With some modification, the methods of the present disclosure for preparing e.g., dicyanoaurate selective MIP beads using a surrogate such as thiocyanate would be applicable for sequestration of other gold salts or for a number of other metal salts such as salts of copper, manganese, nickel, mercury, lead, uranium, cobalt, chromium, REMs, and REEs (or combinations thereof) to name a few of the more toxic or valued elements.

Fast and cost-effective surrogate-based molecularly imprinted polymer techniques of the present disclosure can also be applied in many areas of chemistry, biology and engineering, for example, as an affinity material for sensors detection of chemical, antimicrobial, and dye residues in food, adsorbents for solid phase extraction, binding assays, artificial antibodies, chromatographic stationary phase, catalysis, drug development and screening, byproduct removal in chemical reactions, detection and/or sequestration of explosive(s) and explosive(s) residues, etc. Surrogate-based molecular imprinted polymers pose a wide range of capabilities in extraction through specific micro-cavity binding sites. This technique can be also useful in selective extraction and separation of single elements from a chemical mixture.

The macroreticular beads of the present disclosure prepared using MIP technology are also useful in removing contaminants from an aqueous medium, e.g., drinking water, lakes, streams, irrigation runoff, industrial effluent, mine waste, etc.

Throughout the description, where methods or processes are described as having, including, or comprising specific process steps, the processes also consist essentially of, or consist of, the recited processing steps. Further, it should be understood that the order of steps or order for performing certain actions is immaterial so long as the method remains operable. Moreover, two or more steps or actions can be conducted simultaneously.

EXAMPLES

Example 1 Preparation of Macroreticular Beads

Exemplary Synthesis of Ligands

Exemplary Synthesis of Bis (N-(4-vinylbenzyl)-N-decyl-N,N-dimethylammonium) pentathionate

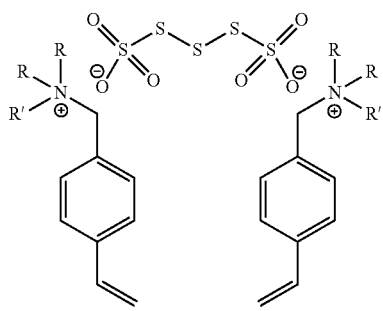

N-(4-vinylbenzyl)-N-decyl-N,N-dimethylammonium chloride (1.08 g, 3.2 mmol) was dissolved in deionized (DI) water (3 mL) in a 20 mL vial equipped with a micro stir bar. Sodium thiosulfate (1 g, 4 mmol) was also dissolved in DI water (0.67 mL) and was added the ligand solution. Immediately, the solution became thick and viscous and additional DI water (3 mL) was added to thin the solution. The solution was cooled to 0° C. with an ice bath while stirring. Concentrated hydrochloric acid (0.67 mL) was added dropwise over the course of one minute. A white material quickly formed, which was then replaced by yellow oil, which separated from solution. The mixture was allowed to settle for overnight at 4° C. The following day the aqueous phase was decanted, and the residue washed with water (5 ml). The residue was vacuum dried to give oil that became waxy below 0° C., (1.30 g, 94% yield). The product was stable for storage at 4° C. for several weeks without noticeable degradation. NMR (400 MHz, CDCl3, Estimated 7.54-7.36 (dd, 8H); 6.68-6.60 (dd, 2H); 5.78-5.73 (d, 2H); 5.31-5.28 (d, 2H); 4.78 (s, 4H); 3.30-3.28 (t, 4H); 3.15 (s, 12H); 1.70 (bs, 4H); 1.25-1.19 (m, 28H); 0.84 (t, 6H).

Exemplary Synthesis of N-(4-vinylbenzyl)-N,N,N-tri-n-pentylammonium thiocyanate A round bottom flask equipped with side arm is degassed, heated to 80° C. and maintained under inert atmosphere. 10 mL of acetonitrile is added, and then 4-vinylbenzylchloride and tri-n-pentyl amine (dried with 3 Å molecular sieves) (11.37 g, 50 mmol, TCI America) is added and kept under inert atmosphere. The mixture is allowed to react six (6) hours at 80° C. The acetonitrile is removed under vacuum and the residue is taken up in 25 mL diethyl ether. The product (N-(4-vinylbenzyl)-N,N,N-tri-n-pentylammonium chloride) is a white solid. The product is washed twice with 25 mL diethyl ether by adding diethyl ether to the product and filtering using 5.5 cm Medium Fast Qualitative filter. The product is a white fluffy solid, which is dried 3 hours under vacuum.

N-(4-vinylbenzyl)-N,N,N-tri-n-pentylammonium chloride (7.60 g, 20 mmol) is taken up in water (50 mL). Potassium thiocyanate (1.94 g, 20 mmol) in water (30 mL) is add to the ligand solution at a rate of 5 mL/min. A white precipitate forms and an oil settles from the solution. The oil is refrigerated overnight. The aqueous solution is decanted and the residue washed with 50 mL of water. The residue is vacuum dried to give an oil (N-(4-vinylbenzyl)-N,N,N-tri-n-pentylammonium thiocyanate) that becomes glassy below 0° C., (Quantitative yield: 8.05 g).

Exemplary Suspension Polymerization

Preparation of Aqueous Phase
Polyvinyl alcohol (PVOH, average Mw 89,000-98,000, 99+% hydrolyzed, 10.26 g) is dissolved in water (540 mL) through gentle heating to 80° C. 4.42 g of boric acid is dissolved in 135 mL in water and slowly added when the PVOH cools to 50° C.
Preparation of the Organic Phase and Polymerization
5 g of the complex is combined with 48.75 mL of ethylhexanol and 1.25 mL of xylenes in a 100 mL Erlenmeyer flask equipped with a stir bar and allowed to stir until fully dissolved. 35.88 mL of styrene and 13.68 mL of divinylbenzene are combined with the solution of complex, and allowed to stir, covered with a septum, under ambient conditions. 0.5 g of AIBN is added to the solution and dissolved completely. When dissolved, the solution is added to an addition funnel and degassed until the reaction temperature reaches 75° C. When the temperature reaches 80° C. to the solution is added to the aqueous phase at a rate of 1 mL/s. The reaction is allowed to proceed, with continuous agitation for approximately 8 hours.
Post-Reaction Bead Cleanup
Upon completion of the reaction, the beads are recovered from the aqueous by filtration. The beads are then soaked in deionized water (200 mL) for 10 minutes then filtered. Soaking in deionized water and filtration is repeated two times. The beads are washed twice in methanol, and twice in acetone. If desired, the beads can be fractionated by size using the appropriate mesh sieves. The beads can then be stored in water indefinitely at a temperature of 5 to 50° C., prior to activation.
Bead Activation
Wet beads are placed into a large jacketed glass column, and all entrained air is removed. The column is then heated to 50° C. and a solution of ferric sulfate hydrate (0.22 M) is added at a rate of 0.1 bed volumes/min for 15 bed volumes. The beads are then rinsed with water (10 bed volumes) at ambient to 50° C.
Properties of Macroreticular Beads Vs Activated Carbon
Macroreticular beads prepared as above were tested with a test solution having the metal ion composition shown below in Table 1.

TABLE 1

| Concentration of major metals and relative percentages found in synthetic flot-con pregnant solution. | | | | | | |
|---|---|---|---|---|---|---|
| Metals | Au | Ag | Cu | Fe | Zn | Hg |
| Concentration (ppm) | 21.67 | 27.34 | 476.4 | 3.49 | 237.7 | 4.19 |
| Relative % | 2.81 | 3.55 | 61.81 | 0.45 | 30.84 | 0.54 |

The beads prepared as described above were found to have a recoverable capacity for dicyanoaurate (i.e., based on the amount stripped from the beads after absorption) of 18 mg Au/g beads, while the recoverable capacity for gold of activated carbon was 3 mg Au/g carbon. The selectivity of the beads for gold was 95% versus 21% for activated carbon. The elution time for the beads was substantially shorter than for activated carbon (2 hours for the beads versus 22 hours for activated carbon), and was carried out at a much lower temperature (room temperature) compared to 95° C. for activated carbon. Another important result was the beads absorbed only very small amount of mercury compared to the activated carbon (FIG. 2). The selectivity of gold vs. copper ($\alpha_{Au,Cu}$) was found to be nearly 40, while the $\alpha$ values for gold versus other contaminating metals were even higher.

The beads prepared as described above, and activated carbon were run through a second cycle with the synthetic flot-con solution. The beads according to the present disclosure retained their performance characteristics, while activity of a comparative activated carbon absorbent fell off dramatically. The beads also appeared to maintain their volume through the various loading, elution, and regeneration cycles.

The beads prepared as described above were run through 16 simulated cycles for gold recovery from a pregnant solution. The cycles represented gold loading, gold stripping, and regeneration of the beads for their next use. The cycles required large changes in pH (from 10.5 to 1.5) and ionic strength, from mM (millimolar) to 2M (molar) solutions. The beads were shown to retain their gold capacity over the 16 cycles, which for this formulation was found to be an extraordinary 30 g Au/kg of MIP beads.

Absorption of Mercury

Macroreticular beads prepared as described above, except using phthalate as the surrogate molecule have a working capacity of about 16 g Hg/Kg beads.

Mechanical Stability of the Beads

The beads prepared as described above were shown to be mechanically more robust than activated carbon by a rather simple method. Three vials were equipped with a stir bar and 10 mL of DI water with the pH adjusted to 10.5. Into the first was placed 100 mg Amberlite 400, into the second vial was placed 100 mg of the present beads, and into the $3^{rd}$ was placed 100 mg of activated carbon. All three vials were placed on stir plate and were stirred for 12 hours at 100 rpm. When finished, both the Amberlite resin and the beads were intact, while the activated carbon had noticeably degraded with the solution above the activated carbon nearly opaque from the suspended carbon particles.

The invention can be embodied in other specific forms without departing from the spirit or essential characteristics thereof. The foregoing embodiments are therefore to be considered in all respects illustrative rather than limiting on the inventions described herein. Scope of the inventions is thus indicated by the appended claims rather than by the foregoing description, and all changes that come within the meaning and range of equivalency of the claims are intended to be embraced therein.

What is claimed is:

1. A plurality of macroreticular polymer beads comprising a copolymer having a plurality of complexing cavities which selectively bind a target metal ion, wherein the copolymer is prepared from:
    (a) a ligand monomer which is cationic or anionic and is complexed to a non-metal surrogate ion,
    (b) a non-ligand monomer selected from the group consisting of methyl methacrylate, styrene and mixtures thereof; and
    (c) a crosslinking monomer selected from the group consisting of ethylene glycol dimethacrylate (EGDMA), divinyl benzene and mixtures thereof;
   wherein:
    (i) the charge of the copolymer in the complexing cavity is opposite the charge of the target metal ion, and
    (ii) the non-metal surrogate ion has substantially the same size, shape and charge as the target metal ion.

2. The macroreticular polymer beads of claim 1, wherein the ligand monomer is a cation and the target metal ion is an anionic metal complex.

3. The macroreticular polymer beads of claim 1, wherein the target metal ion is selected from the group consisting of gold salts, silver salts, copper salts, manganese salts, nickel salts, mercury salts, lead salts, uranium salts, cobalt salts, chromium salts and combinations thereof.

4. The macroreticular polymer beads of claim 3, wherein the non-metal surrogate ion is selected from the group consisting of thiocyanate, pentathionate, isophthalate, and succinate.

5. The macroreticular polymer beads of claim 1, wherein the ligand monomer is a 4-vinylbenzyl ammonium compound.

6. The macroreticular polymer beads of claim 5, wherein the ligand monomer is a N,N,N-tri-$C_{4-10}$alkyl-N-(4-vinylbenzyl) ammonium compound.

7. The macroreticular polymer beads of claim 6, wherein the ligand monomer is a N,N,N-tri-$C_{4-6}$alkyl-N-(4-vinylbenzyl) ammonium compound.

8. The macroreticular polymer beads of claim 1, wherein the ligand monomer is N,N,N-tripentyl-N-(4-vinylbenzyl) ammonium, the non-metal surrogate ion is thiocyanate, the non-ligand monomer is styrene, the cross-linking monomer is divinyl benzene, and the target metal ion is $Au(CN)_2^-$.

9. The macroreticular polymer beads of claim 1, wherein the ligand monomer is N,N,N-tripentyl-N-(4-vinylbenzyl) ammonium, the non-metal surrogate ion is thiocyanate, the non-ligand monomer is methyl methacrylate, the cross-linking monomer is ethylene glycol dimethacrylate (EGDMA), and the target metal ion is $Au(CN)_2^-$.

10. The macroreticular polymer beads of claim 1, wherein the ligand monomer is vinylbenzyl tri-n-butyl ammonium, the non-metal surrogate ion is thiocyanate, the non-ligand monomer is styrene, the cross-linking monomer is divinyl benzene, and the target metal ion is $Au(CN)_2^-$.

11. The macroreticular polymer beads of claim 1, wherein the ligand monomer is vinylbenzyl tri-n-butyl ammonium, the non-metal surrogate ion is thiocyanate, the non-ligand monomer is methyl methacrylate, the cross-linking monomer is ethylene glycol dimethacrylate (EGDMA), and the target metal ion is $Au(CN)_2^-$.

12. The macroreticular polymer beads of claim 1, wherein the ligand monomer is N,N,N-tripentyl-N-(4-vinylbenzyl) ammonium, the non-metal surrogate ion is thiocyanate, the non-ligand monomer is methyl methacrylate, the cross-linking monomer is divinyl benzene, and the target metal ion is $Au(CN)_2^-$.

13. The macroreticular polymer beads of claim 1, wherein the ligand monomer is bis(N-(4-vinylbenzyl)-N-decyl-N,N-dimethylammonium), the non-metal surrogate ion is pentathionate, the non-ligand monomer is styrene, the cross-linking monomer is divinyl benzene, and the target metal ion is $Au(S_2O_3)_2^{3-}$.

14. The macroreticular polymer beads of claim 1, wherein the ligand monomer is N,N,N-tripentyl-N-(4-vinylbenzyl) ammonium, the non-metal surrogate ion is pentathionate, the non-ligand monomer is styrene, the cross-linking monomer is divinyl benzene, and the target metal ion is $Au(S_2O_3)_2^{3-}$.

15. A method of selectively sequestering one or more target metal ions from a solution of the one or more target metal ion ions admixed with other ions, comprising first contacting the macroreticular polymer beads of claim 1 with a stripping solution, whereby the non-metal surrogate ions are removed from the macroreticular polymer beads, then contacting the stripped beads with the solution, thereby selectively sequestering the target ion in the macroreticular polymer beads.

16. A method of recovering gold from gold-containing ore, comprising:
    (1) crushing the gold-containing ore,
    (2) contacting the crushed ore with a lixiviant, thereby forming an aqueous solution comprising an anionic gold complex,
    (3) contacting the aqueous solution with macroreticular polymer beads of claim 1, whereby the anionic gold complex is selectively complexed in the complexing cavities of the beads,
    (4) stripping the beads with a stripping solution, whereby the anionic gold complex is substantially removed from the beads, and
    (5) electrolytically reducing the recovered gold complex to form gold metal.

17. The method of claim 16, wherein the lixiviant is aqueous chloride, the anionic gold complex is $AuCl_4^-$, and further comprising, after step (2):
    (a) reducing the $AuCl_4^-$ with a reducing agent to form $Au^+$, and
    (b) complexing the $Au^+$ with aqueous cyanide to form an aqueous solution of $AuCN_2^-$,
    wherein in step (3), the aqueous solution of $AuCN_2^-$ is selectively complexed in the complexing cavities of the beads.

18. A method of preparing macroreticular molecularly imprinted polymer beads comprising polymerizing:
    (a) a ligand monomer which is cationic or anionic and is complexed to a non-metal surrogate ion,
    (b) a non-ligand monomer selected from the group consisting of methyl methacrylate, styrene, and mixtures thereof; and
    (c) a crosslinking monomer selected from the group consisting of ethylene glycol dimethacrylate (EGDMA), divinyl benzene, and mixtures thereof;
    thereby forming a plurality of macroreticular molecularly imprinted polymer beads, each having a plurality of complexing cavities which selectively bind a target metal ion,
    wherein the size, shape, and charge of the non-metal surrogate ion is substantially the same as the target metal ion.

19. The method of claim 18, wherein the ligand monomer is a cation and the target metal ion is an anionic metal complex.

20. The method of claim 19, wherein the target metal ion is selected from the group consisting of gold salts, silver salts, copper salts, manganese salts, nickel salts, mercury salts, lead salts, uranium salts, cobalt salts, chromium salts and combinations thereof.

21. The method of claim 20, wherein the non-metal surrogate ion is selected from the group consisting of thiocyanate, pentathionate, isophthalate, and succinate.

22. The method of claim 21, wherein the target metal ion is $Au(CN)_2^-$ and the non-metal surrogate ion is thiocyanate.

23. The method of claim 18, wherein the ligand monomer is a 4-vinylbenzyl ammonium compound.

24. The method of claim 23, wherein the ligand monomer is a N,N,N-tri-$C_{4-10}$alkyl-N-(4-vinylbenzyl) ammonium compound.

25. The method of claim 24, wherein the ligand monomer is a N,N,N-tri-$C_{4-6}$alkyl-N-(4-vinylbenzyl) ammonium compound.

26. The method of claim 18, wherein the ligand monomer is N,N,N-tripentyl-N-(4-vinylbenzyl) ammonium, the non-metal surrogate ion is thiocyanate, the non-ligand monomer is styrene, the cross-linking monomer is divinyl benzene, and the target metal ion is $Au(CN)_2^-$.

27. The method of claim 18, wherein the ligand monomer is N,N,N-tripentyl-N-(4-vinylbenzyl) ammonium, the non-metal surrogate ion is thiocyanate, the non-ligand monomer is methyl methacrylate, the cross-linking monomer is ethylene glycol dimethacrylate (EGDMA), and the target metal ion is $Au(CN)_2^-$.

28. The method of claim 18, wherein the ligand monomer is vinylbenzyl tri-n-butyl ammonium, the non-metal surrogate ion is thiocyanate, the non-ligand monomer is styrene, the cross-linking monomer is divinylbenzene, and the target metal ion is $Au(CN)_2^-$.

29. The method of claim 18, wherein the ligand monomer is vinylbenzyl tri-n-butyl ammonium, the non-metal surrogate ion is thiocyanate, the non-ligand monomer is methyl methacrylate, the cross-linking monomer is ethylene glycol dimethacrylate (EGDMA), and the target metal ion is $Au(CN)_2^-$.

30. The method of claim 18, wherein the ligand monomer is N,N,N-tripentyl-N-(4-vinylbenzyl) ammonium, the non-metal surrogate ion is thiocyanate, the non-ligand monomer is methyl methacrylate, the cross-linking monomer is divinyl benzene, and the target metal ion is $Au(CN)_2^-$.

31. The method of claim 18 wherein the ligand monomer is bis(N-(4-vinylbenzyl)-N-decyl-N,N-dimethylammonium), the non-metal surrogate ion is pentathionate, the non-ligand monomer is styrene, the cross-linking monomer is divinyl benzene and the target metal ion is $Au(S_2O_3)_2^{3-}$.

32. The method of claim 18, wherein the ligand monomer is N,N,N-tripentyl-N-(4-vinylbenzyl) ammonium, the non-metal surrogate ion is pentathionate, the non-ligand monomer is styrene, the cross-linking monomer is divinyl benzene, and the target metal ion is $Au(S_2O_3)_2^{3-}$.

* * * * *